(12) United States Patent
Miyazaki

(10) Patent No.: US 10,346,027 B2
(45) Date of Patent: Jul. 9, 2019

(54) INFORMATION PROCESSING APPARATUS, INFORMATION PROCESSING METHOD, AND PROGRAM

(75) Inventor: Reiko Miyazaki, Tokyo (JP)

(73) Assignee: SONY CORPORATION, Tokyo (JP)

( * ) Notice: Subject to any disclaimer, the term of this patent is extended or adjusted under 35 U.S.C. 154(b) by 1411 days.

(21) Appl. No.: 12/783,311

(22) Filed: May 19, 2010

(65) Prior Publication Data

US 2010/0300771 A1    Dec. 2, 2010

(30) Foreign Application Priority Data

May 26, 2009  (JP) .................................. 2009-126950

(51) Int. Cl.
*G06F 3/041*   (2006.01)
*G06F 3/0488*  (2013.01)
*G06F 3/0346*  (2013.01)

(52) U.S. Cl.
CPC .......... *G06F 3/0488* (2013.01); *G06F 3/0346* (2013.01)

(58) Field of Classification Search
CPC ............................. G06F 3/0488; G06F 3/0346
USPC ................................................. 345/156–173
See application file for complete search history.

(56) References Cited

U.S. PATENT DOCUMENTS

| 5,996,080 A | 11/1999 | Silva et al. |
| 7,158,117 B2 * | 1/2007 | Sato ...................... G06F 3/0346 178/18.03 |
| 7,830,360 B2 * | 11/2010 | Jeng et al. .................... 345/156 |
| 8,304,733 B2 * | 11/2012 | Alameh ................ G06F 3/0308 250/349 |
| 2003/0085870 A1 | 5/2003 | Hinckley |
| 2004/0021645 A1 * | 2/2004 | Kobayashi et al. .......... 345/173 |
| 2006/0161870 A1 * | 7/2006 | Hotelling .............. G06F 3/0485 715/863 |

(Continued)

FOREIGN PATENT DOCUMENTS

| JP | 2000-020199 | 1/2000 |
| JP | 2000-359577 | 11/2000 |

(Continued)

OTHER PUBLICATIONS

European Search Report dated Sep. 23, 2010, in Munich, in corresponding European Patent Application No. 10 15 8771.

(Continued)

*Primary Examiner* — Benyam Ketema
(74) *Attorney, Agent, or Firm* — Paratus Law Group, PLLC

(57) ABSTRACT

An information processing apparatus is provided which includes an operation tool detection unit for detecting at least a contact operation by an operation tool on the information processing apparatus, a state detection unit for detecting a static/non-static state or an orientation of the information processing apparatus, and a mode control unit for controlling a mode for detecting an operation by the operation tool on the information processing apparatus according to the detected static/non-static state or orientation of the information processing apparatus. This enables the mode for detecting the operation by the operation tool on the information processing apparatus to be controlled according to the static/non-static state or orientation of the information processing apparatus, so that the detection mode can be appropriately controlled according to an operating state of a user.

17 Claims, 25 Drawing Sheets

(56) References Cited

U.S. PATENT DOCUMENTS

| | | | |
|---|---|---|---|
| 2007/0054651 A1 | 3/2007 | Farmer et al. | |
| 2007/0102525 A1 | 5/2007 | Orr et al. | |
| 2008/0254822 A1 | 10/2008 | Tilley | |
| 2009/0100384 A1 | 4/2009 | Louch | |
| 2009/0237371 A1* | 9/2009 | Kim | G06F 3/0485 345/173 |
| 2009/0237372 A1* | 9/2009 | Kim | G06F 3/044 345/173 |
| 2009/0295715 A1* | 12/2009 | Seo | G06F 3/0488 345/156 |
| 2010/0295781 A1* | 11/2010 | Alameh | G06F 3/017 345/158 |
| 2011/0032198 A1* | 2/2011 | Miyazawa | G06F 3/0416 345/173 |
| 2012/0046906 A1* | 2/2012 | Alameh | H04M 1/0202 702/150 |
| 2013/0344862 A1* | 12/2013 | Alameh | G06F 1/1694 455/418 |

FOREIGN PATENT DOCUMENTS

| | | |
|---|---|---|
| JP | 2002-258982 | 9/2002 |
| JP | 2007-133691 | 5/2007 |
| JP | 2008-040966 | 2/2008 |
| WO | WO 2007/097414 | 8/2007 |

OTHER PUBLICATIONS

Dec. 11, 2012, Japanese Office Action of related JP Patent Application No. 2009-126950.

Apr. 11, 2016, European Office Action for related EP Application No. 10158771.5.

May 2, 2018, European Summons to attend oral proceedings issued for related EP Application No. 10158771.5.

* cited by examiner

FIG.1
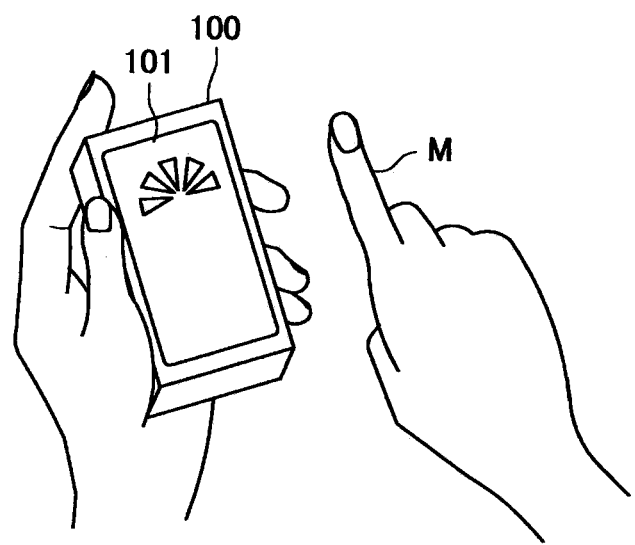
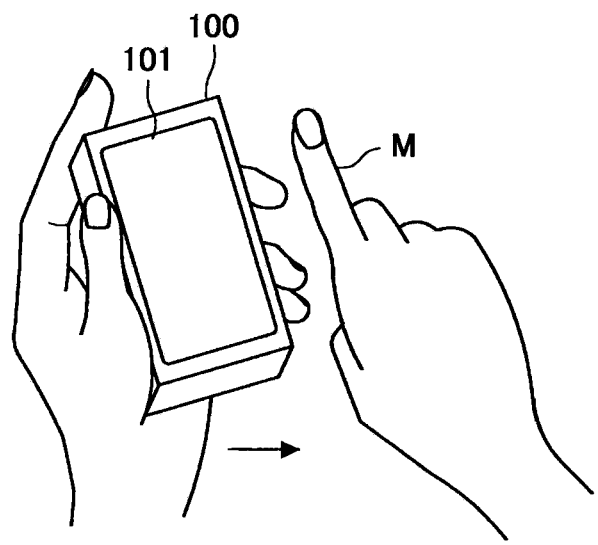

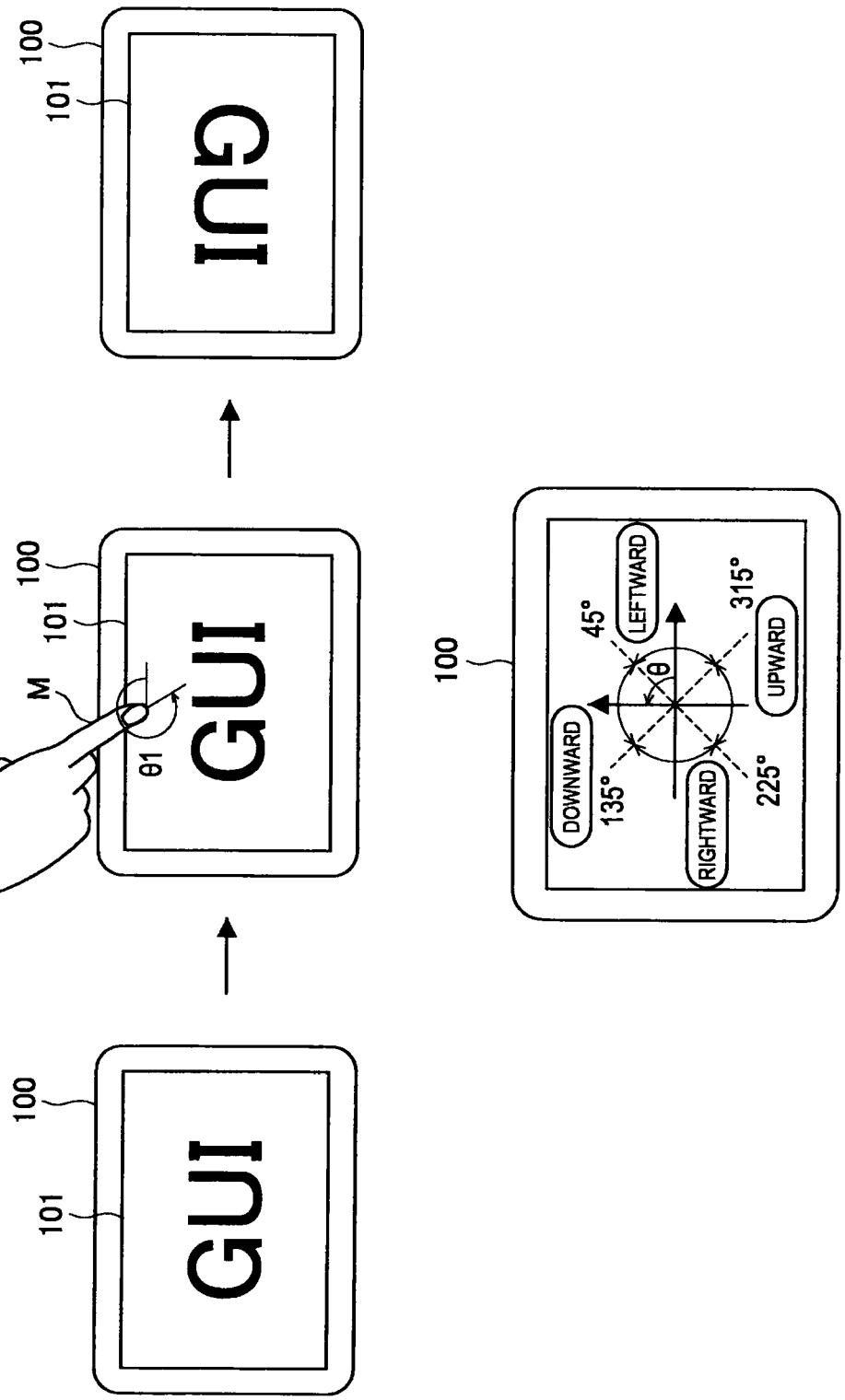

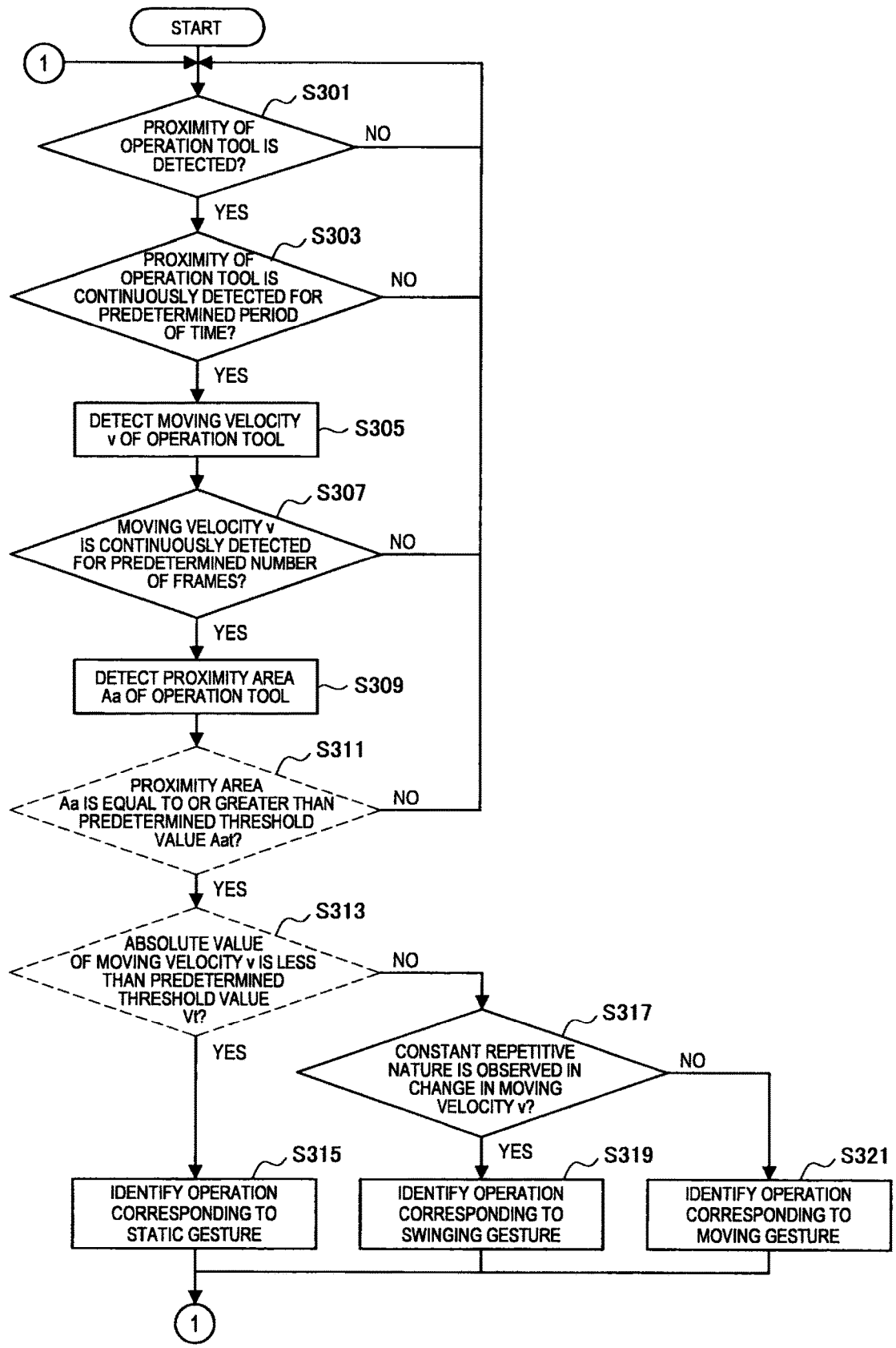

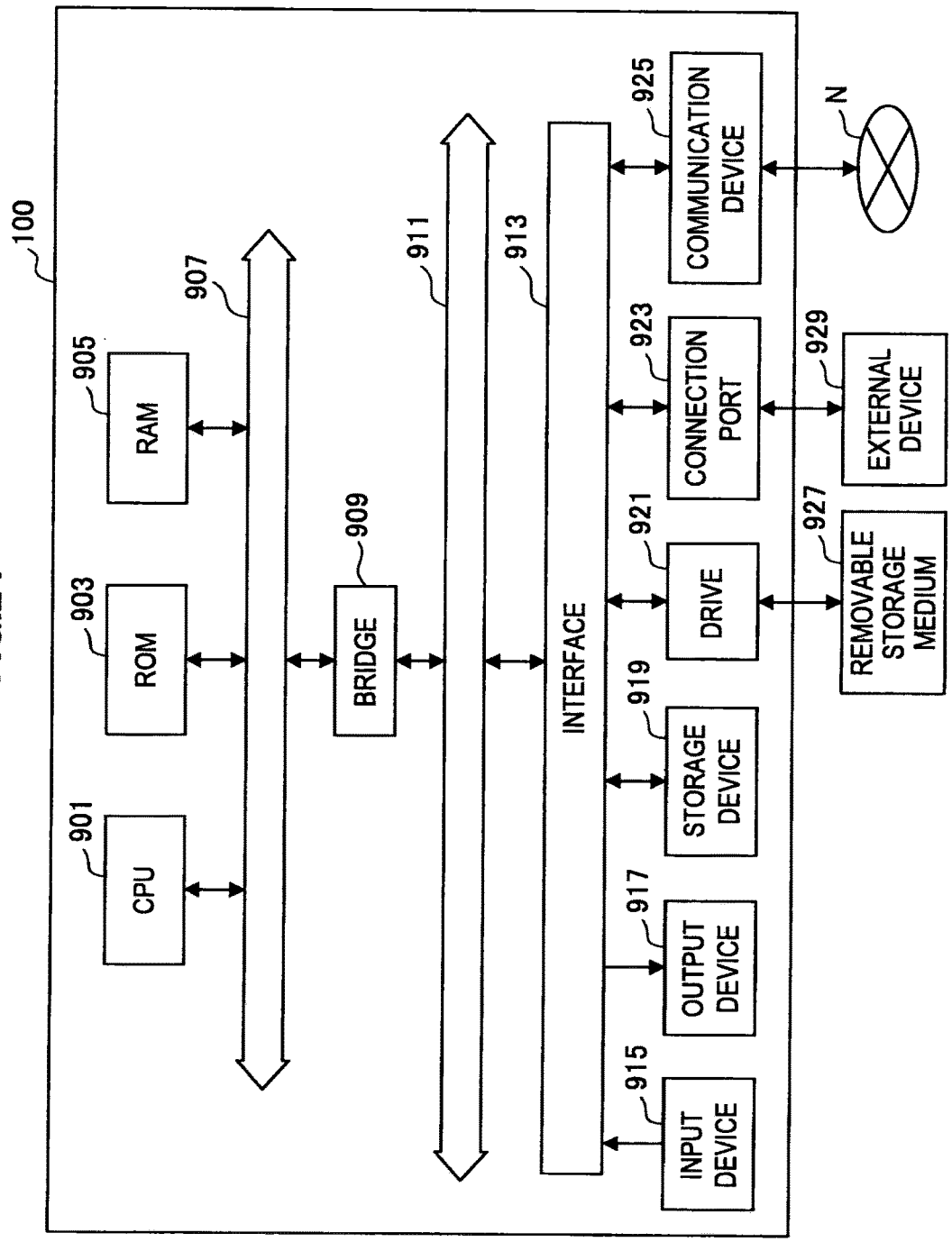

INFORMATION PROCESSING APPARATUS, INFORMATION PROCESSING METHOD, AND PROGRAM

BACKGROUND OF THE INVENTION

Field of the Invention

The present invention relates to an information processing apparatus, an information processing method, and a program.

Description of the Related Art

There has been known an information processing apparatus which detects a movement of an operation tool such as a finger, a hand or a stylus and which performs an interaction with a user. The information processing apparatus detects a contact/proximity of the operation tool to a sensor, a remote movement of the operation tool M captured by the sensor or the like and identifies an operation input by the user, for example.

In particular, in the case of executing an application which supports a proximity operation or proximity and remote operations with a contact operation by the operation tool, it may be desired to appropriately control a mode for detecting each operation according to an operating state of the user. This is because, in the case where the information processing apparatus is not in a static state, a contact operation is performed but proximity and remote operations (particularly a remote operation) is difficult to be performed due to an issue of detection accuracy or the like, for example.

SUMMARY OF THE INVENTION

If an attempt is made to detect each operation at the same time without controlling the detection mode, detection processing corresponding to the proximity operation or the proximity and remote operations is performed with the contact operation, so that efficiency of the detection processing decreases. Moreover, in the case where there are different power supply systems for a detection unit of the contact operation, a detection unit of the proximity operation, and a remote sensor, power is supplied to an unnecessary detection unit or sensor, so that the power consumption increases. Moreover, it is highly possible that a contact operation intended by the user is falsely detected as a proximity operation or that a remote operation intended by the user is falsely detected as a proximity operation.

Although. there has been also known an information processing apparatus with which a detection mode can be controlled by hand, in this case, the user temporarily stops an operation for the manual control, so that a good operational environment is not necessarily enjoyed.

In light of the foregoing, it is desirable to provide an information processing apparatus, an information processing method, and a program which are capable of appropriately controlling a mode for detecting an operation by an operation tool on the information processing apparatus, according to an operating state of a user.

According to a first embodiment of the present invention, there is provided an information processing apparatus including an operation tool detection unit for detecting at least a contact operation by an operation tool on the information processing apparatus, a state detection unit for detecting a static/non-static state or an orientation of the information processing apparatus, and a mode control unit for controlling a mode for detecting the operation by the operation tool on the information processing apparatus according to the detected static/non-static state or orientation of the information processing apparatus. This enables the mode for detecting the operation by the operation tool on the information processing apparatus to be controlled according to the static/non-static state or orientation of the information processing apparatus, so that the detection mode can be appropriately controlled according to an operating state of a user.

The operation tool detection unit may detect the contact operation and a proximity operation by the operation tool on a display panel of the information processing apparatus, the state detection unit may detect the static/non-static state of the information processing apparatus, and the mode control unit may enable a proximity detection mode for detecting the proximity operation in the case where the static state of the information processing apparatus is detected and may disable the proximity detection mode in the case where the static state of the information processing apparatus is not detected. This enables the mode for detecting the proximity operation to be controlled to be active or inactive, according to the operating state of the user.

The operation tool detection unit may detect a remote operation by the operation tool on the information processing apparatus as well as the contact operation and a proximity operation by the operation tool on a display panel of the information processing apparatus, the state detection unit may detect the static/non-static state of the information processing apparatus, and the mode control unit may enable a remote detection mode for detecting the remote operation and disable a proximity detection mode for detecting the proximity operation in the case where the static state of the information processing apparatus is detected, and may disable the remote detection mode for detecting the remote operation and enable the proximity detection mode for detecting the proximity operation in the case where the static state of the information processing apparatus is not detected. This enables the mode for detecting the proximity operation or the remote operation to be controlled to be active or inactive, according to the operating state of the user.

The operation tool detection unit may detect the contact operation by the operation tool on two or more contact detection units provided for the information processing apparatus, the state detection unit may detect the orientation of the information processing apparatus, and the mode control unit may enable a first contact detection mode for detecting the contact operation on one of the two or more contact detection units or a second contact detection mode for detecting the contact operation on another one of the two or more contact detection units, according to the orientation of the information processing apparatus. This enables the mode for detecting the contact operation by the two or more detection units to be controlled, according to the operating state of the user.

According to a second embodiment of the present invention, there is provided an information processing method including the steps of detecting a static/non-static state or an orientation of an information processing apparatus, and controlling a mode for detecting an operation by an operation tool on the information processing apparatus according to the detected static/non-static state or orientation of the information processing apparatus.

According to a third embodiment of the present invention, there is provided a program for causing a computer to execute an information processing method according to the second embodiment of the present invention.

According to the embodiments of the present invention described above, there can be provided the information processing apparatus, the information processing method, and the program, which are capable of appropriately controlling the mode for detecting the operation by the operation tool on the information processing apparatus, according to the operating state of the user.

BRIEF DESCRIPTION OF THE DRAWINGS

FIG. 1 is a diagram showing an outline of an information processing apparatus according to an embodiment of the present invention;

FIG. 10A is a schematic view showing the rotation processing of the display direction;

FIG. 11 is a flow diagram showing identification processing of an operation based on a proximity gesture;

FIG. 24 is a block diagram showing an example of the hardware configuration of the information processing apparatus

DETAILED DESCRIPTION OF THE EMBODIMENT

Figure 2:
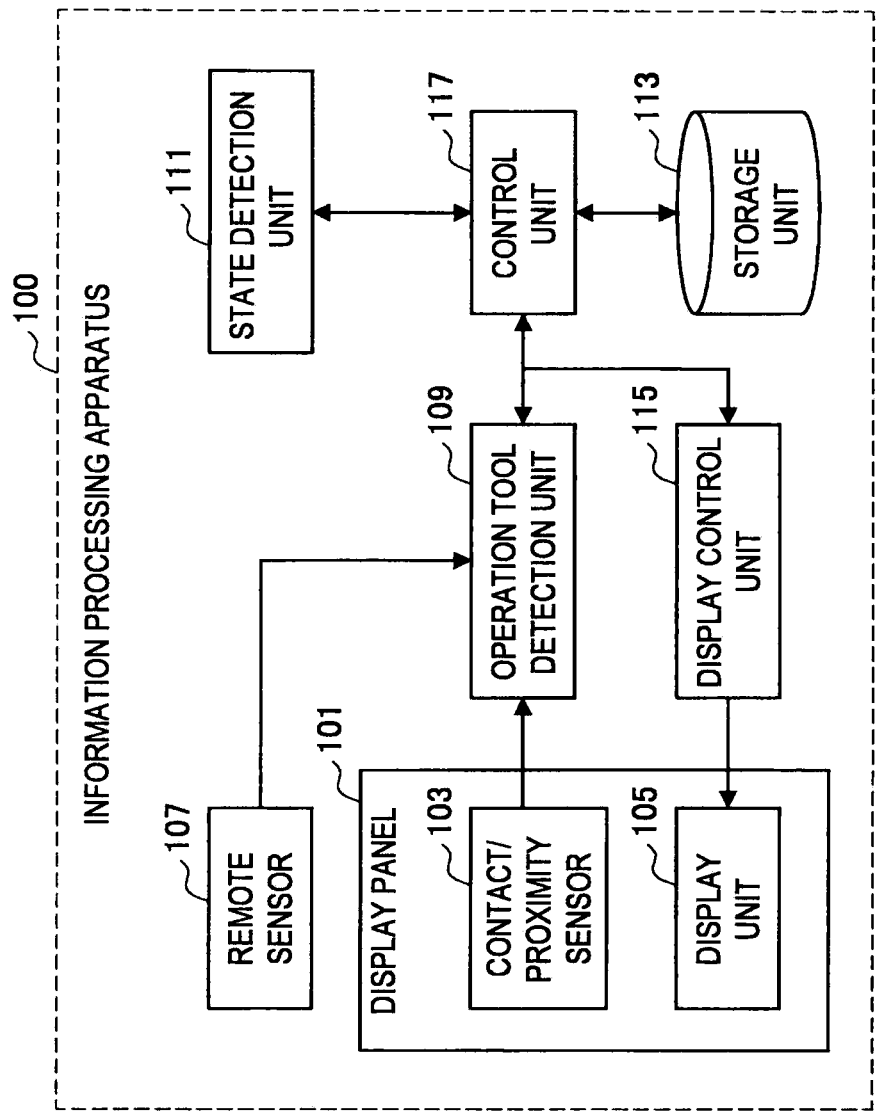
FIG. 2 is a block diagram showing an example of the functional configuration of the information processing apparatus according to the embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

[1. Outline of Information Processing Apparatus 100]

FIG. 1 is a diagram showing an outline of an information processing apparatus 100 according to an embodiment of the present invention. The information processing apparatus 100 according to the embodiment of the present invention at least detects contact of an operation tool M such as a finger, a hand or a stylus with a display panel 101. Moreover, the information processing apparatus 100 according to some embodiments detects proximity of the operation tool M to the display panel 101 and/or remote movement of the operation tool M with respect to the information processing apparatus 100. In addition, although a case where the information processing apparatus 100 includes the display panel 101 will be described in the following, the information processing apparatus 100 may be connected to the display panel 101 via a communication means.

The information processing apparatus 100 detects a static/non-static state or an orientation of the information processing apparatus 100 and controls a mode for detecting operation of the operation tool M on the information processing apparatus 100 according to the detected static/non-static state or orientation of the information processing apparatus 100. Here, the information processing apparatus 100 detects the static/non-static state or the orientation of the information processing apparatus 100 by an acceleration sensor, a gyroscope and the like. Since by this there is controlled the mode for detecting operation of the operation tool M on the information processing apparatus 100 according to the static/non-static state or the orientation of the apparatus, the detection mode can be appropriately controlled according to the operating state of the user.

In particular, the information processing apparatus 100 according to the embodiment of the present invention detects contact operation and proximity operation of the operation tool M on the display panel 101 of the information processing apparatus 100 and at the same time detect the static/non-static state of the information processing apparatus 100. Then, the information processing apparatus 100 enables a proximity operation mode for detecting proximity operation in the case where the static state of the information processing apparatus 100 is detected and disables the proximity operation mode in the case where the static state of the information processing apparatus 100 is not detected. By this, the mode for detecting proximity operation can be controlled to be active or inactive according to the operating state of the user.

[2. Functional Configuration of Information Processing Apparatus 100]

FIG. 2 is a block diagram showing an example of the functional configuration of the information processing apparatus 100 according to the embodiment of the present invention. The information processing apparatus 100 includes the display panel 101, a remote sensor 107, an operation tool detection unit 109, a state detection unit 111, a storage unit 113, a display control unit 115, and a control unit 117.

the display panel 101 functions as a contact/proximity sensor 103 and a display unit 105. The contact/proximity sensor 103 captures contact/proximity state of the operation tool M. The contact/proximity sensor 103 is, for example, an optical or capacitive sensor, but in the following will be assumed a case of capturing contact/proximity state of the operation state M based on a light receiving state of the display panel 101. The display unit 105 displays an object, content, a processing result of an application or the like under the control of the display control unit 115. In addition, the object is an arbitrary object composing a GUI, such as an icon, a button, a thumbnail or the like, for example The remote sensor 107 includes a stereo camera or the like, which images and captures a remote movement of the operation tool M such as a predetermined gesture.

the operation tool detection unit 109 detects a state of the operation tool M by using the contact/proximity sensor 103 and the remote sensor 107. The operation tool detection unit 109 detects contact/proximity/movement and a remote movement of the operation tool M. The operation tool detection unit 109 particularly detects an indication direction, a predetermined state or the like of the operation tool M. The operation tool detection unit 109 detects the indication direction of the operation tool M with respect to the display panel 101 and particularly detects the indication direction and a moving direction of the operation tool M moving while touching the display panel 101. In addition, the indication direction of the operation tool M may be detected also at the time of proximity as well as the time of contact.

Based on a light receiving state, the operation tool detection unit 109 detects the presence or absence of contact/proximity of the operation tool M, the contact/proximity area of the operation tool M, the indication direction and a contact/proximity gesture of the operation tool M with respect to the display panel 101. In addition, a detection method of the operation tool M by the contact/proximity sensor 103 will be described in detail below. The operation tool detection unit 109 detects a remote gesture based on an imaging result of the remote sensor 107. The operation tool detection unit 109 detects the predetermined gesture by comparing the contact/proximity/remote movement of the operation tool M with preliminarily registered gesture information.

The state detection unit 111 includes the acceleration sensor, the gyroscope and the like and detects the static/non-static state and the orientation of the information processing apparatus 100. The display control unit 115 controls the display of the object, the content, the processing result of the application or the like by the display unit 105.

the storage unit 113 stores therein an information processing program, an application program, object data, gesture information and the like. The control unit 117 controls each unit by the execution of the information processing program and controls the overall operation of the information processing apparatus 100.

The control unit 117 functions as an operation identification unit for identifying the operation direction input by the operation tool M, based on the indication direction of the operation tool M. Here, the control unit 117 particularly identifies the direction of an operation input by the operation tool M, based on the detected indication direction and moving direction of the operation tool M.

Moreover, the control unit 117 functions as a mode control unit for controlling the mode for detecting operation of the operation tool M on the information processing apparatus 100 according to the static/non-static state or the orientation of the information processing apparatus 100.

[3. Detection Method of the Operation Tool M]

On the display panel 101, RGB pixels and light receiving sensors are arranged in matrix. The light receiving sensor functions as the contact/proximity sensor 103 by receiving the light irradiated from the display panel 101 and reflected by the operation tool M and capturing the contact/proximity state of the operation state M based on a light receiving state. Then, the operation tool detection unit 109 creates a sensor image S by digitally processing the output result of the contact/proximity sensor 103.

The operation tool detection unit 109 calculates a luminance value corresponding to each of the pixels and indicating the light receiving state based on the sensor image S and performs a ternary process to the luminance value by using two predetermined threshold values of Th1 and Th2. In the ternary process, the luminance value of the each pixel is classified into a first, a second, and a third categories, and the area of the sensor image S is divided into a first, a second and a third areas A1, A2 and A3 corresponding to each of the categories. The first, the second, the third areas A1, A2, and A3 correspond to areas of high luminance, medium luminance and low luminance and are specified as a contact area, a proximity area, and non-contact/non-proximity area of the operation tool M, respectively.

The operation tool detection unit 109 detects the contact of the operation tool M with the display panel 101 based on the presence of the first area A1 and detects the proximity of the operation tool M to the display panel 101 based on the presence of the second area A2. Moreover, the operation tool detection unit 109 detects each of the contact area and the proximity area of the operation tool M by calculating the areas of the first and the second areas A1 and A2.

In particular, the operation tool detection unit 109 calculates positions of the center of gravity G1 and G2 of the first and the second areas A1 and A2, calculates a direction of a straight line (the line of the center of gravity) connecting the calculated positions of the center of gravity G1 and G2 and detects the indication direction of the operation tool M based on the position of the center of gravity G1 of the first area A1 and the line of the center of gravity. The indication direction of the operation tool M is defined as the direction indicating the center of gravity G1 of the first area A1 along the line of the center of gravity.

Figure 3A:
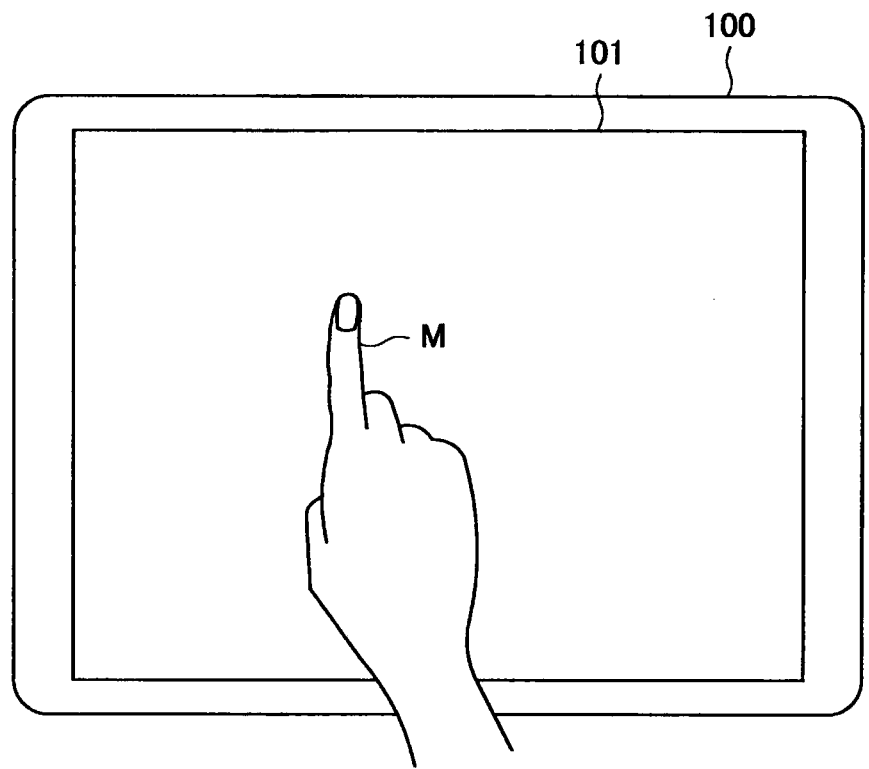
FIG. 3A is a diagram showing a state of an operation tool on a display panel.
Figure 3B:
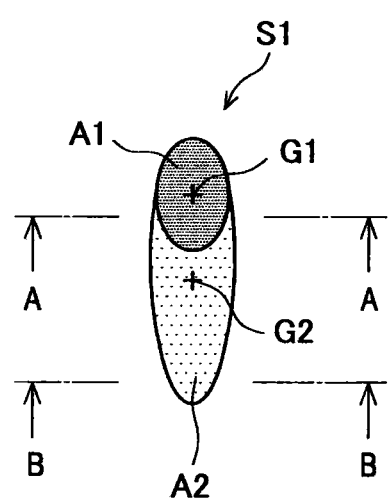
FIG. 3B is a diagram showing areas specified on a sensor image in the state shown in FIG. 3A.
Figure 4A:
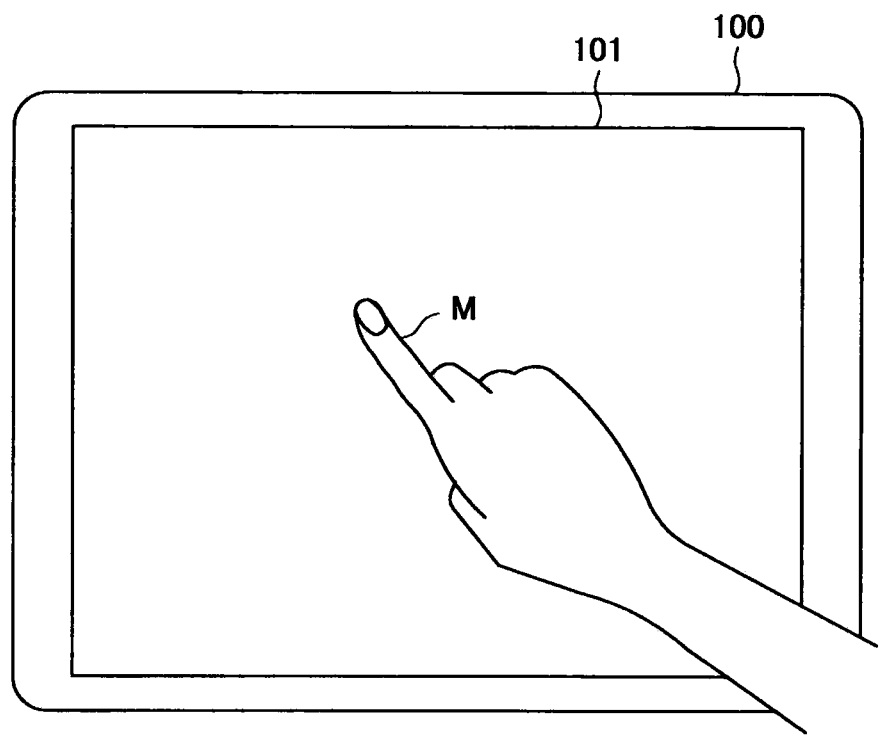
FIG. 4A is a diagram showing a state of the operation tool on the display panel.
Figure 4B:
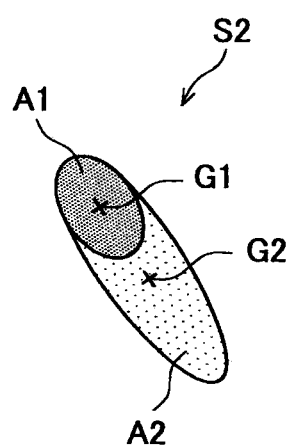
FIG. 4B is a diagram showing areas specified on a sensor image in the state shown in FIG. 4A.
Figure 5A:
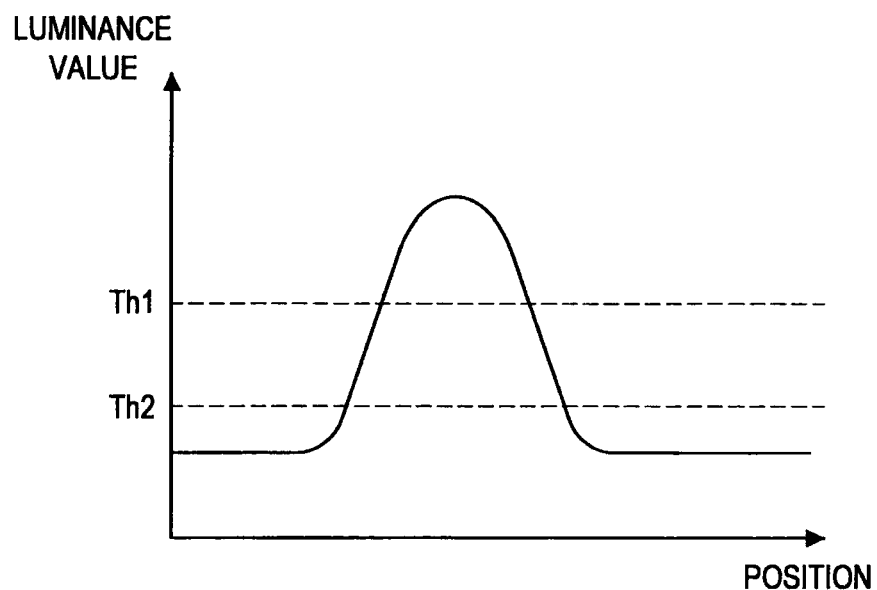
FIG. 5A is a graph showing a distribution of luminance values on the line A-A in FIG. 3A.
Figure 5B:
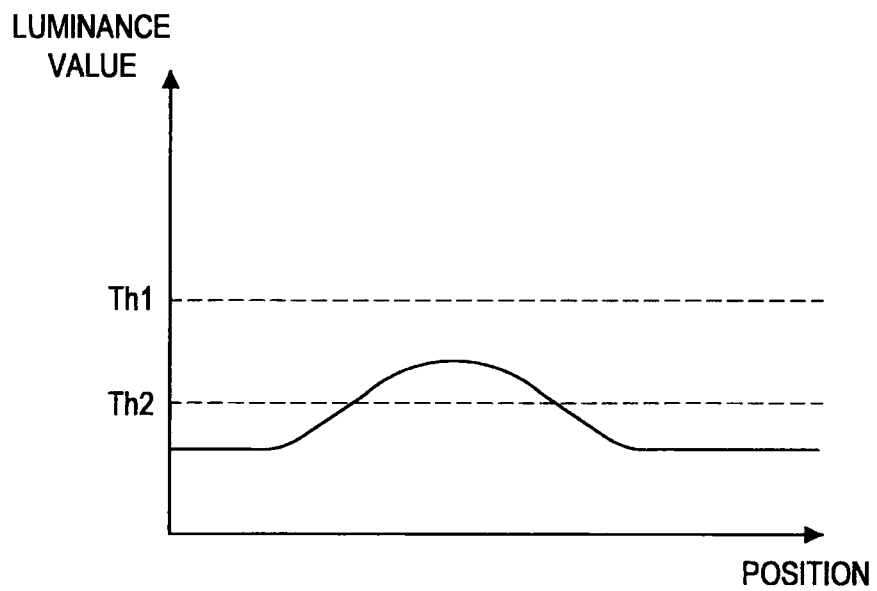
FIG. 5B is a graph showing a distribution of luminance values on the line B-B in FIG. 3A.

In the following, a detection method of the indication direction of the operation tool M will be described with reference to FIG. 3 to FIG. 5. FIG. 3 and FIG. 4 are diagrams showing states of the operation tool M on the display panel 101 (FIG. 3A and FIG. 4A) and the first and the second areas specified on the sensor images S1 and S2 (FIG. 3B and FIG. 4B). FIG. 5 are graphs showing distributions of luminance values on the sensor image S1 in FIG. 3B, and FIG. 5A and FIG. 5B show the distributions of luminance values on the A-A line and B-B line, respectively.

FIG. 3 and FIG. 4 show a case of changing the indication direction of the operation tool M on the display panel 101. In this case, a tip portion of the operation tool M (fingertip) touches the display panel 101 and a part other than the tip portion of the operation tool M (the ball of the finger) comes into proximity with the display panel 101.

In the state shown in FIG. 3, the operation tool M indicates the upward direction of GUI display (see FIG. 3A). In this case, the operation tool detection unit 109 detects the indication direction of the operation tool M as the upward direction of the GUI display based on the distribution of the luminance values on the sensor image S1 (see FIG. 3B). For example, in the example shown in FIG. 5, contact and proximity of the operation tool M are detected from the first and the second areas A1 and A2 detected on the A-A line (see FIG. 5A), and proximity of the operation tool M is detected from the second area A2 detected on the B-B line (see FIG. 5B).

In the state shown in FIG. 4, the operation tool M indicates the upper left direction of the GUI display (see FIG. 4A). In this case, the operation tool detection unit 109 detects the indication direction of the operation tool M as the upper left direction of the GUI display based on the distribution of the luminance values on the sensor image S2 (see FIG. 4B).

[4-1. Identification Processing of an Operation Direction]

In the following, there will be given a description of a processing of identifying the direction of an operation input by the operation tool M based on the indication direction and the moving direction of the operation tool M moving while touching the display panel 101.

Figure 6:
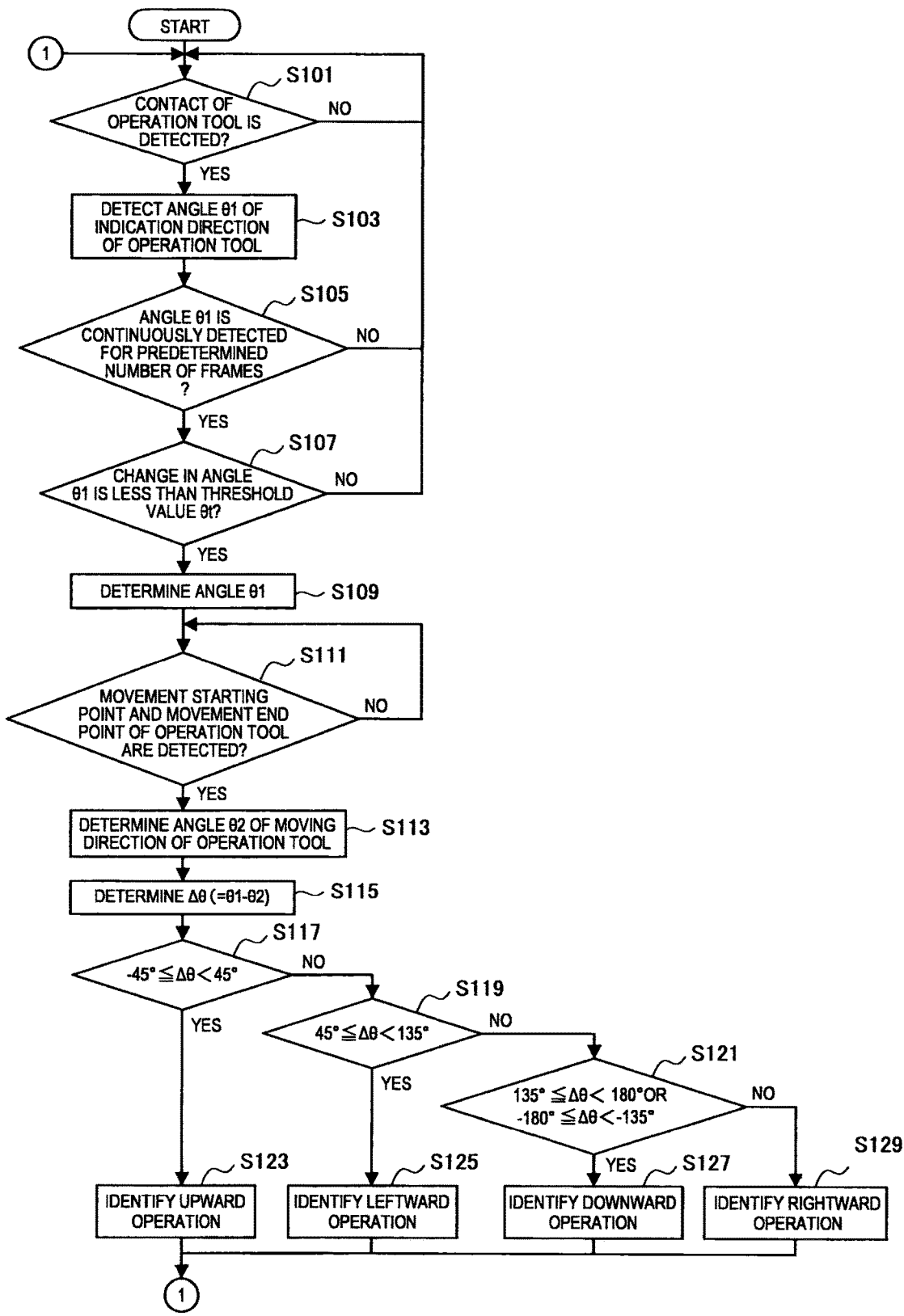
FIG. 6 is a flow diagram showing identification processing of an operation direction.
Figure 7A:
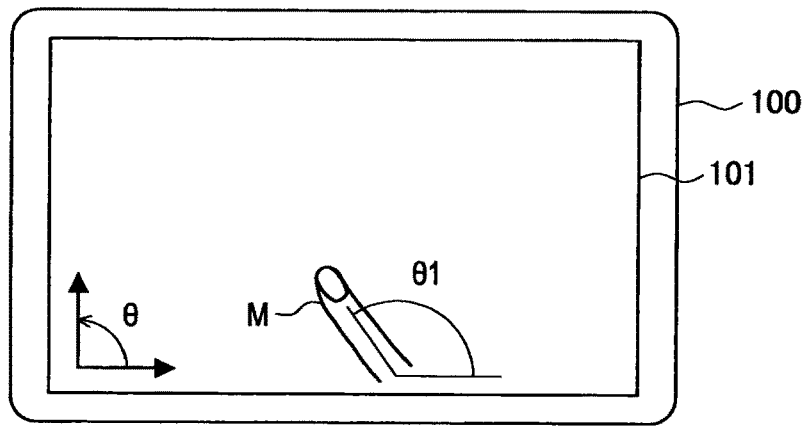
FIG. 7A is a schematic view showing the identification processing of the operation direction.

FIG. 6 is a flow diagram showing the identification processing of the operation direction and FIG. 7 and FIG. 8 are schematic views showing the identification processing of the operation direction.

When the operation tool detection unit 109 detects contact of the operation tool M (step S101), the operation tool detection unit 109 detects the indication direction of the operation tool M based on the detection method of the operation tool M described above (S103). Here, the indication direction of the operation tool M may be detected in either the state in which the operation tool M is moving or the state in which the operation tool is not moving.

The indication direction of the operation tool M is defined as an angle $\theta 1$ based on a coordinate system virtually set on the display panel 101 as shown in FIG. 7, for example. The coordinate system can be set independently of the orientation of the display panel 101, but in the following will be assumed a case where a usual rectangular coordinate system is set based on the vertical direction and the horizontal direction of the display panel 101. In this case, the angle $\theta 1$ is measured in the counterclockwise direction from the first quadrant to the fourth quadrant of the rectangular coordinate system.

The operation tool detection unit 109 determines whether the angle $\theta 1$ is continuously detected for the predetermined number of frames (S105). Each of detected values is stored in a buffer which is not shown in figures, for example. Then, if change in the detection results is less than a predetermined threshold value $\theta t$ (S107), the operation tool detection unit 109 determines the angle $\theta 1$ as an intermediate value of the detection results or the like (S109).

Figure 7B:
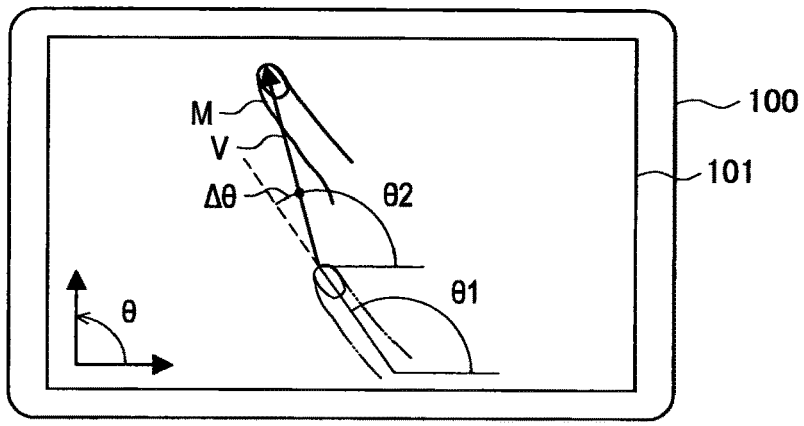
FIG. 7B is a schematic view showing the identification processing of the operation direction.

After determining the angle $\theta 1$, the operation tool detection unit 109 detects a movement starting point and a movement end point of the operation tool M (S111) and determines the moving direction of the operation tool M (S113). The moving3 direction of the operation tool M is defined as an angle $\theta 2$ based on the same coordinate system as the angle $\theta 1$ based on a movement vector V that connects the movement starting point and the end point of the operation tool M, as shown in FIG. 7B.

In the following, a case where the operation tool M moves in a straight line will be assumed for convenience of description. In this case, the movement starting point is defined as a point where the contact of the operation tool M is first detected in the state of not having detected the contact of the operation tool M. In the same manner, the movement end point is defined as a point where the non-contact of the operation tool M is first detected in the state of having detected the movement of the operation tool M in contact. In addition, in the case where the operation tool M moves in curving, there can be defined the movement starting point and the movement end point for each curve movement based on a changing point of the moving direction.

Figure 7C:
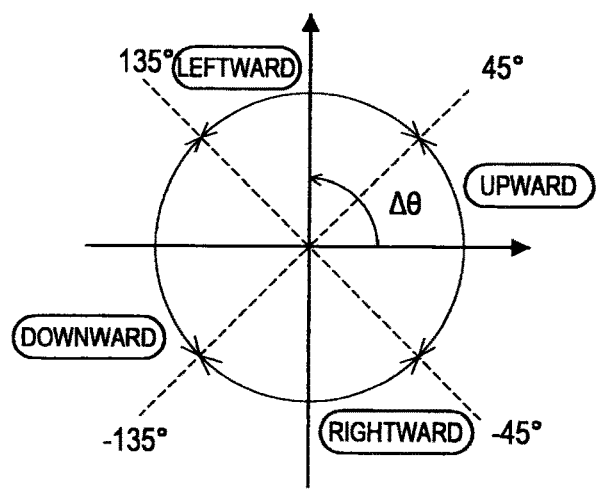
FIG. 7C is a schematic view showing the identification processing of the operation direction.

The control unit 117 determines a difference $\Delta\theta$ ($=\theta 1-\theta 2$) between the angles $\theta 1$ and $\theta 2$ that indicate the indication direction and the moving direction of the operation tool M (S115). The control unit 117 identifies the direction of the operation input by the operation tool M based on the difference $\Delta\theta$ (S117, S119, S121). The operation direction is identified based on the difference $\Delta\theta$ between the angles $\theta 1$ and $\theta 2$ as shown in FIG. 7C.

The operation direction is, for example, identified as upward in the case of $-45°\leq\Delta\theta\leq 45°$ (S123) and is identified as leftward in the case of $45°\leq\Delta\theta\leq 135°$ (S125). In the same manner, the operation direction is identified as downward in the case of $135°\leq\Delta\theta\leq 180°$ or $-180°\leq\Delta\theta<-135°$ (S127) and is identified as rightward in the case of $-135°\leq\Delta\theta<-45°$ (S129).

In addition, in order to improve the accuracy of the identification of the operation direction, the operation direction may be identified as upward in the angular range $-30°\leq\Delta\theta<30°$. Moreover, the angular range may be adjusted according to the dominant hand of the user.

In FIG. 8, there is shown, as an example of the identification processing of the operation direction, a case of selecting a tab T of a slider bar O vertically displayed on the GUI display and operating the tab upward.

Figure 8A:
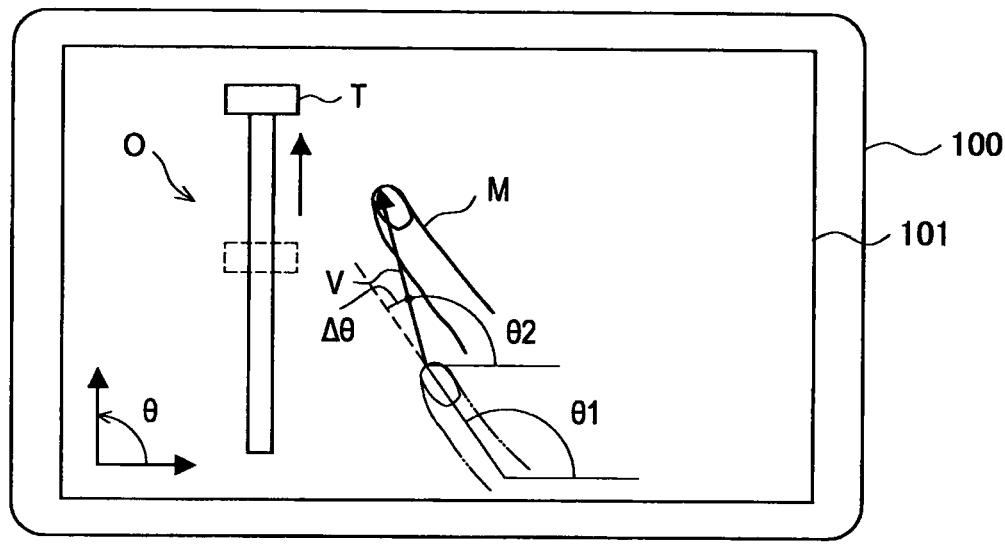
FIG. 8A is a schematic view showing the identification processing of the operation direction.

As shown in FIG. 8A, in the case where the orientation of the display panel 101 with respect to the user is the same as the orientation of the GUI display, (i.e., a case where the display panel 101 is arranged in the manner that the top thereof is oriented upward with respect to the user), the user drags the tab T upward with respect to the display panel 101 so as to correspond to the upward direction of the GUI display. Here, the drag operation may be performed on the tab T as the object, or may be performed in the state in which the tab T is selected, for example, in an area where no object is displayed.

For example, when the indication direction and the moving direction of the operation tool M are detected as the angle θ1=135° and the angle θ2=120°, the difference is Δθ=15°, so that as shown in FIG. 7C, an upward operation is identified. This enables the user to operate the tab T upward.

Figure 8B:
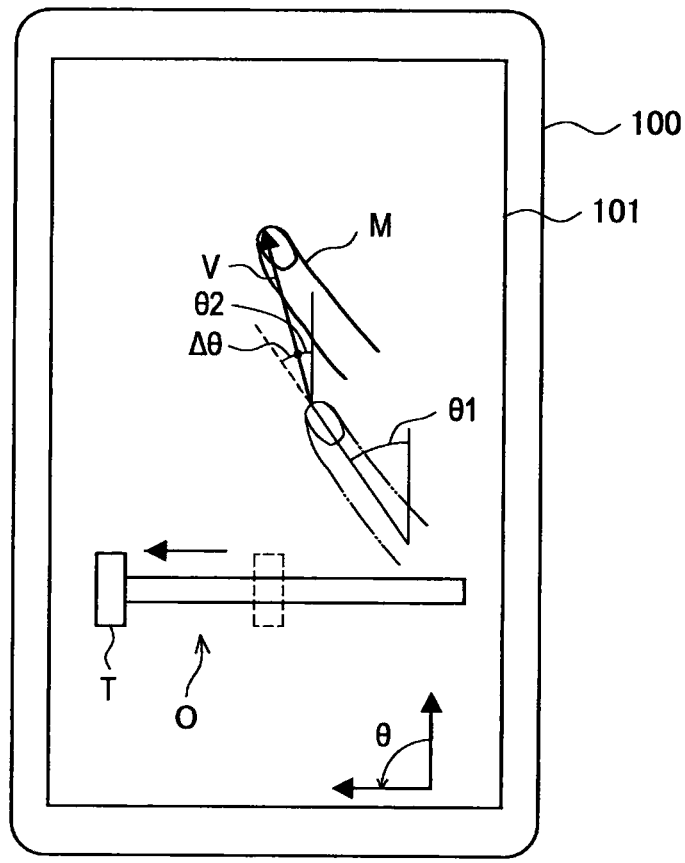
FIG. 8B is a schematic view showing the identification processing of the operation direction.

On the other hand, as shown in FIG. 8B, the orientation of the display panel 101 with respect to the user is different from the orientation of the GUI display (e.g., the case where the display panel 101 is arranged in the manner that the top thereof is oriented on the left side with respect to the user), the user drags the tab T upward with respect to the display panel 101 so as to correspond to the right direction of the GUI display.

For example, when the indication direction and the moving direction of the operation tool M are detected as the angle θ1=45° and the angle θ2=20°, the difference is Δθ=25°, so that as shown in FIG. 7C, an upward operation is identified. This enables the user to operate the tab T upward by dragging the tab T upward with respect to the display panel 101 in the same manner as the case where the both orientations are the same FIG. 8A) even in the case where the orientation of the display panel 101 with respect to the user is different from the orientation of the GUI display (FIG. 8B)

Accordingly, the user does not have to perform a drag operation so as to correspond to the orientation of the GUI display or to perform a drag operation after changing the orientation of the display panel 101, after recognizing the orientation of the GUI display. Thus, an operation independent of the orientation of the GUI display, namely the orientation of the display panel 101, is possible, and the operation environment can be improved.

For example, an intuitive operation independent of the orientation of the display panel 101 is possible in the case of adjusting the volume up/down by the operation in the upward/downward direction, in the case of adjusting a playback position forward/backward by the operation to the left/right, and in the case of scrolling the display of the display panel 101 corresponding to the operation in the upward/downward/left/right direction. In particular, the operation can be improved in the case of directly operating the content itself without identifying an object (the case of performing a drag operation without identifying a position on the display panel 101)

[4-2. Rotation Processing of a Display Direction]

In the following, there will be described a processing of identifying the direction of an operation of rotating the GUI display of the display panel 101, based on the indication direction of the operation tool M.

Figure 9:
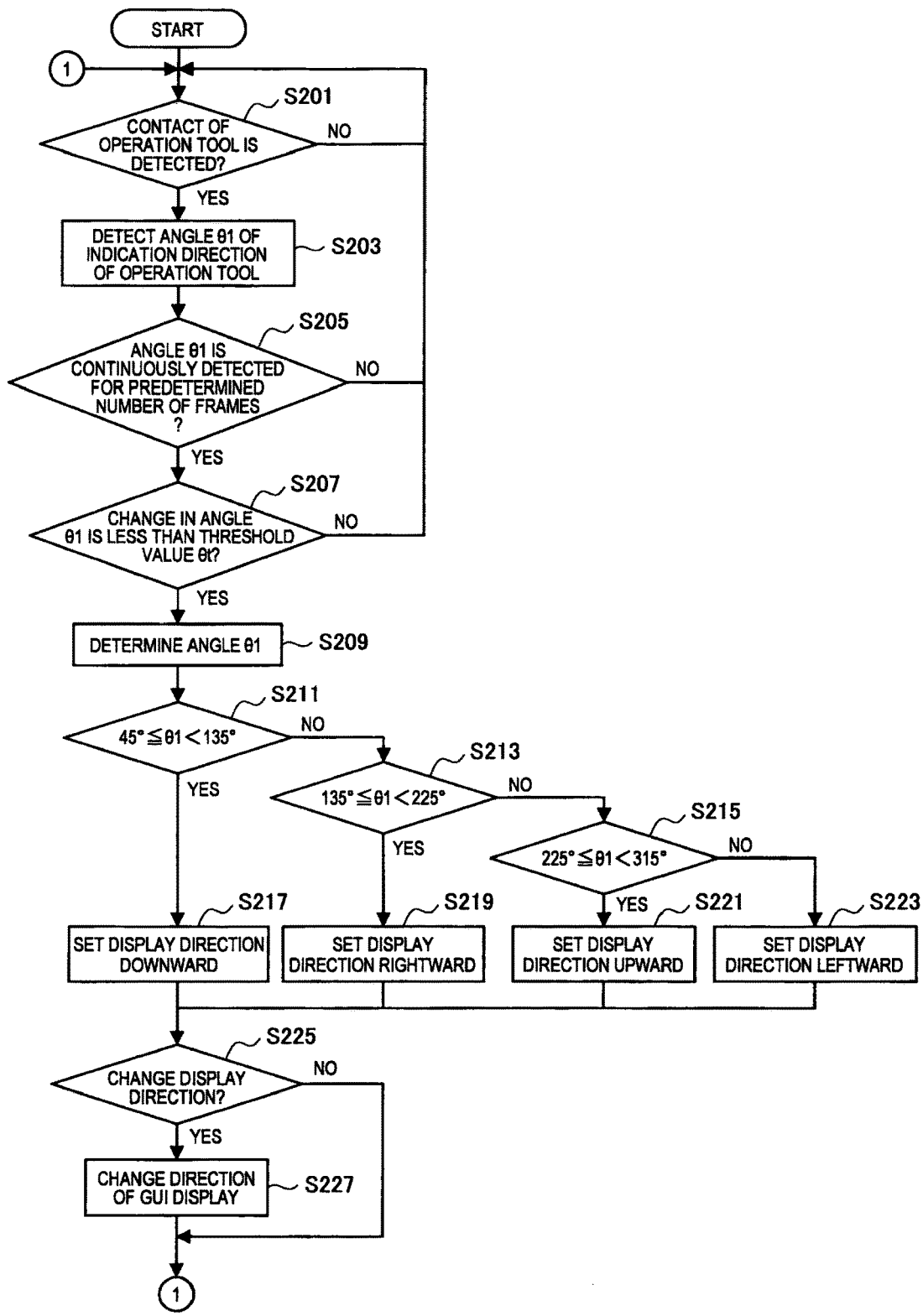
FIG. 9 is a flow diagram showing rotation processing of a display direction.
Figure 10B:
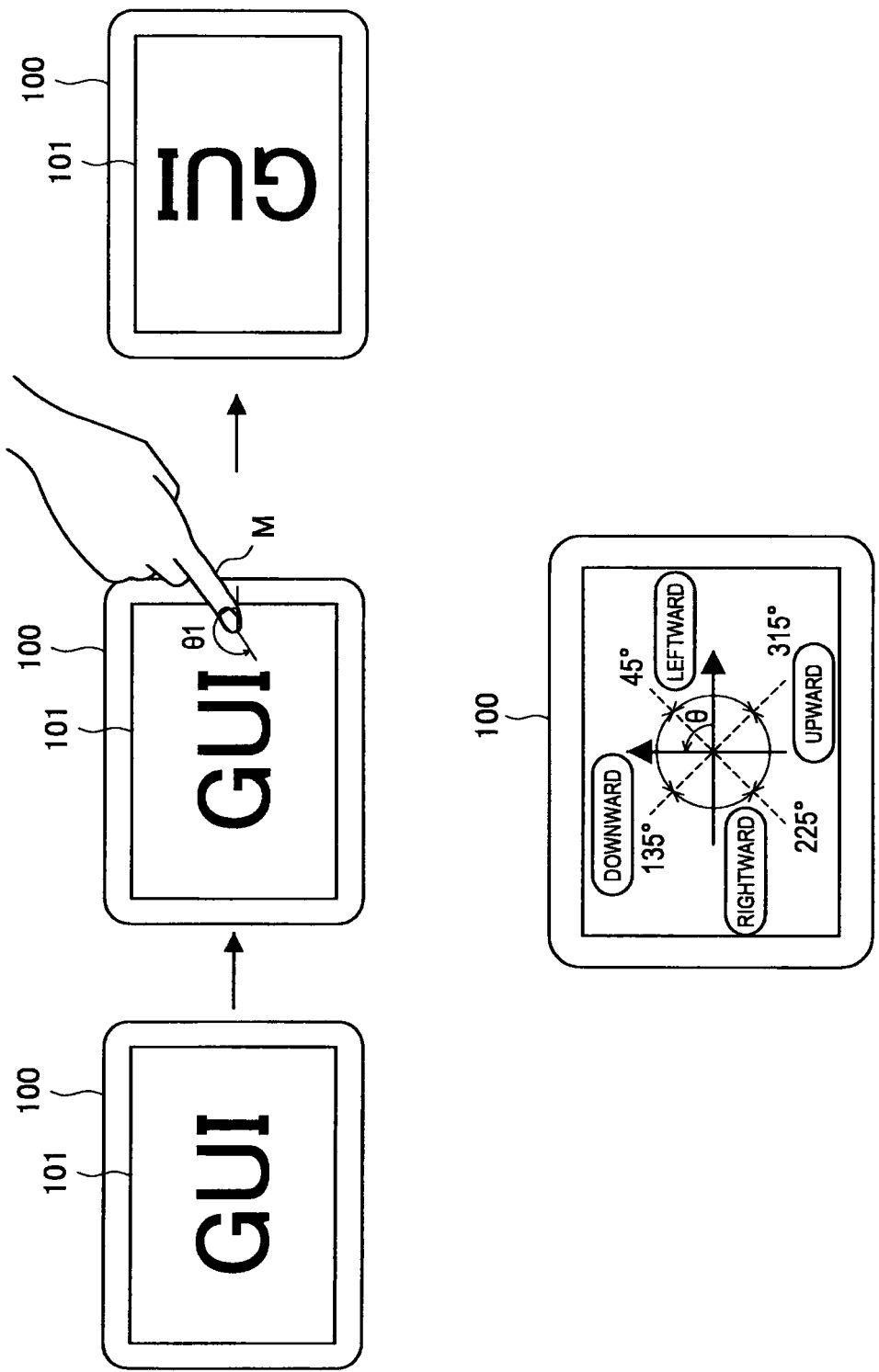
FIG. 10B is a schematic view showing the rotation processing of the display direction.

FIG. 9 and FIG. 10 are a flow diagram and schematic views showing rotation processing of a display direction. FIG. 10 show a case of rotating the display direction downwards (FIG. 10A) and a case of rotating the display direction leftward (FIG. 10B).

When the operation tool detection unit 109 detects contact of the operation tool M (step S201), the operation tool detection unit 109 detects the indication direction of the operation tool M based on the detection method of the operation tool M described above (S203). Here, the indication direction of the operation tool M may be detected in either the state in which the operation tool M is moving or the state in which the operation tool is not moving.

The indication direction of the operation tool M is defined as an angle θ1 based on a coordinate system virtually set on the display panel 101 as shown in FIGS. 10A and 10B, for example. In the following, there will be assumed a case where a usual rectangular coordinate system is set based on the vertical direction and the horizontal direction of the display panel 101. In this case, the angle θ1 is measured in the counterclockwise direction from the first quadrant to the fourth quadrant of the rectangular coordinate system.

The operation tool detection unit 109 determines whether the angle θ1 is continuously detected for the predetermined number of frames (S205). Then, if changes in the detection results are less than a predetermined threshold value θt (S207), the operation tool detection unit 109 determines the angle θ1 as an intermediate value of the detection results or the like.

The control unit 117 identifies the direction of the operation of rotating the GUI display of the display panel 101, based on the angle θ1 indicating the indication direction of the operation tool M (S211, S213, S215). The display direction is, for example, identified as downward in the case of 45°≤θ1<135° (S217) and is identified as rightward in the case of 135°≤θ1<225° (S219). In the same manner, the display direction is identified as upward in the case of 225≤θ1<315° (S221) and is identified as leftward in the case of 0°θ1<45° or 315°≤θ1<360° (S223).

In addition, in order to improve the accuracy of the identification of the operation direction, the operation direction may be identified as downward in the angular range 30°Δθ<120°. Moreover, the angular range may be adjusted according to the dominant hand of the user.

Here, the direction of the GUI display after the rotation is defined as an orientation in which the top of the GUI display is displayed with respect to the display panel 101 at the time of normal use (in the normal position). That is, a downward display direction means that the top of the GUI display is displayed on the bottom of the display panel 101 in the normal position, and a leftward direction means that the top of the GUI display is displayed on the left of the display panel 101 in the normal position.

When the display direction is identified, the display control unit 115, in the case where the display direction has to be changed (S225), controls the display unit 105 to rotate the GUI display of the display panel 101 according to the identified operation direction (S227). In addition, when the indication direction is changed again, the display direction is changed according to the changed indication direction.

Thus, by rotating the direction of the GUI display of the display panel 101 based on the indication direction of the operation tool M, an operation independent of the direction of the GUI display, namely the orientation of the display panel 101, is possible, and the operation environment can be improved

[4-3. Identification Processing of an Operation Based on a Proximity Gesture]

In the following, there will be described a processing of identifying an operation input by the operation tool M, based on a proximity gesture by the operation tool M on the display panel 101.

Figure 12A:
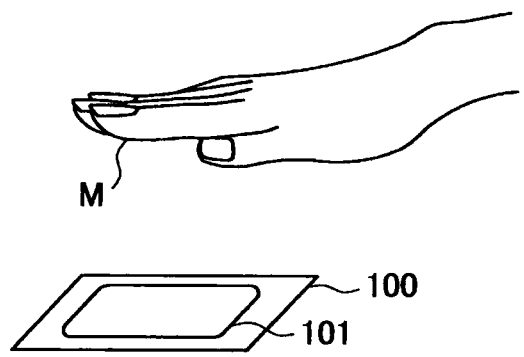
FIG. 12A is a schematic view showing the identification processing of the operation based on the proximity gesture (static gesture)
Figure 12B:
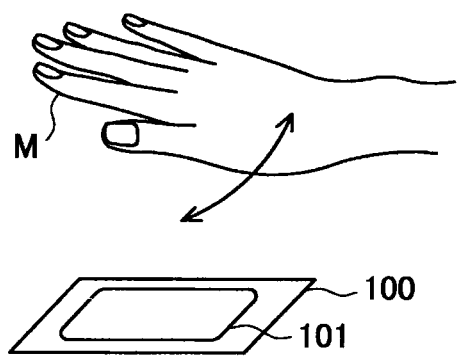
FIG. 12B is a schematic view showing the identification processing of the operation based on the proximity gesture (swinging gesture)
Figure 12C:
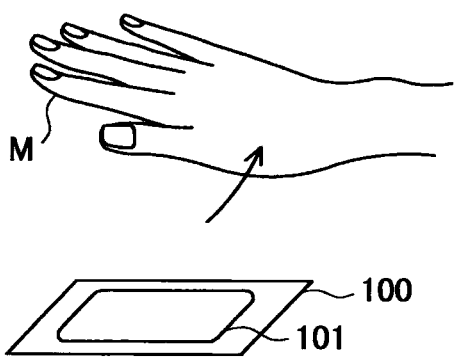
FIG. 12C is a schematic view showing the identification processing of the operation based on the proximity gesture (moving gesture)

FIG. 11 and FIG. 12 are a flow diagram and schematic view showing identification processing of an operation based on a proximity gesture. As an example of the as the proximity gesture, there are given in FIG. 12 a static gesture of the operation tool M (FIG. 12A), a swinging gesture of the operation tool M (FIG. 12B), and a moving gesture of the operation tool M (FIG. 12C).

For example, the static gesture of the operation tool M is detected as a movement of holding a hand still over the display panel 101. The swinging gesture of the operation tool M is detected as a movement of swinging the hand horizontally (and/or vertically) over the display panel 101. The moving gesture of the operation tool M is detected as a movement of moving the hand horizontally (and/or vertically) over the display panel 101.

In the following, there will be described a case of identifying three operations corresponding to the static gesture, the swinging gesture, and the moving gesture of the operation tool M, but there may be identified four or more gestures based on other proximity gestures. In addition, there is assumed that each proximity gesture is associated in advance with gesture information and a specific operation.

When the operation tool detection unit 109 detects proximity of the operation tool M (S301), the operation tool detection unit 109 determines whether proximity of the operation tool M is continuously detected for a predetermined period of time (e.g., 500 ms) (S303). If the proximity of the operation tool is continuously detected, the operation tool detection unit 109 starts to detect a moving state (S305), and if the proximity of the operation tool is not continuously detected, the operation tool detection unit 109 continues to detect the proximity of the operation tool M.

The moving state of the operation tool M is detected as a horizontal movement and/or vertical movement of the operation tool M with respect to the display panel 101 within the detection range of the contact/proximity sensor 103. The moving state of the operation tool M is, for example, detected as the moving distance/velocity/acceleration and the like of the operation tool M, but in the following will be assumed a case of detecting the moving velocity v of the operation tool M.

The operation tool detection unit 109 determines whether the moving velocity v of the operation tool M is continuously detected for the predetermined number of frames (S307).

The control unit 117 determines whether the absolute value of the moving velocity v of the operation tool M is less than a predetermined threshold value vt (S313). Then, in the case of positive determination result, the control unit 117 identifies an operation corresponding to the static gesture (S315). On the other hand, if the moving velocity v is equal to or greater than the predetermined threshold value vt and a constant repetitive nature is observed in the change in the moving velocity v (in the case of "Yes" at the step S317), the control unit 117 identifies an operation corresponding to the swinging gesture (S319). Moreover, if the moving velocity v is equal to or greater than the predetermined threshold value vt and constant repetitive nature is not observed in the change in the moving velocity v (in the case of "No" at the step S317), the control unit 117 identifies an operation corresponding to the moving gesture (S321).

Here, the operation tool detection unit 109 may detect the proximity area Aa along with the moving velocity v of the operation tool M (S309). The control unit 117 can accurately identify the operation based on the proximity gesture by identifying the operation based on the moving velocity v only when the proximity area Aa satisfies a predetermined threshold value Aat (e.g., 70% of the area of the display panel 101) (S311). In addition, the proximity area Aa may be determined after the determination by comparison (S313, S317) of the moving velocity v and the threshold value vt.

By this, various operations can be input based on the proximity gesture of the operation tool M on the display panel 101. Accordingly, the user can quickly input a desired operation with the operation tool M without bringing the operation tool M into contact with an object on the display panel 101 (or a button of the information processing apparatus 100). Moreover, the user can perform an intuitive operation by giving an arbitrary meaning to each proximity gesture, such as relating the static gesture to a mute operation, relating the swinging gesture to a shuffle operation of a playlist, or relating the moving gesture to a skip operation in the play order.

[4-4. Identification Processing of an Operation Based on a Contact Gesture]

In the following, there will be described a processing of identifying an operation input by the operation tool M, based on a contact gesture by the operation tool M on the display panel 101.

Figure 13:
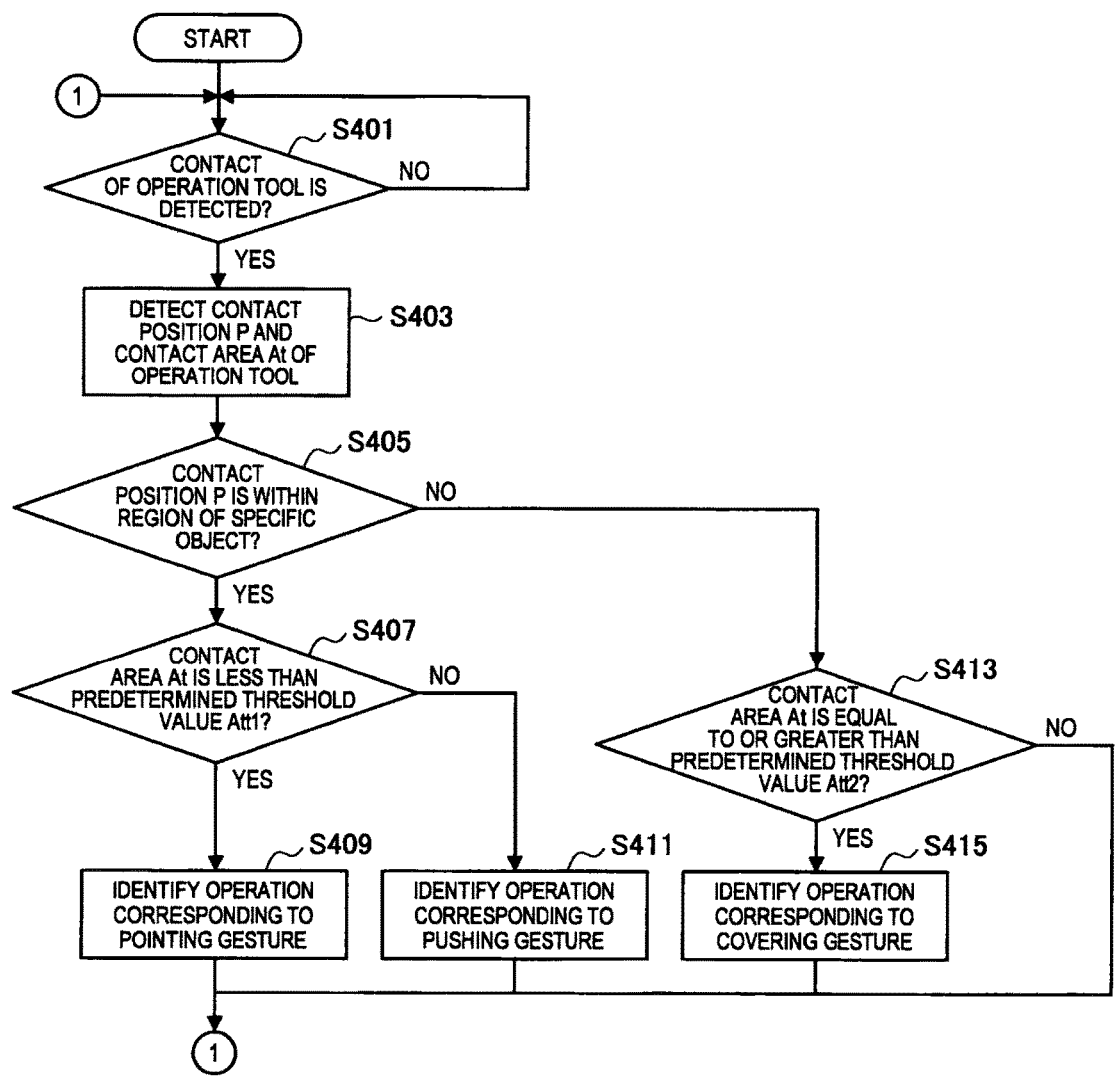
FIG. 13 is a flow diagram showing identification processing of an operation based on a contact gesture.
Figure 14A:
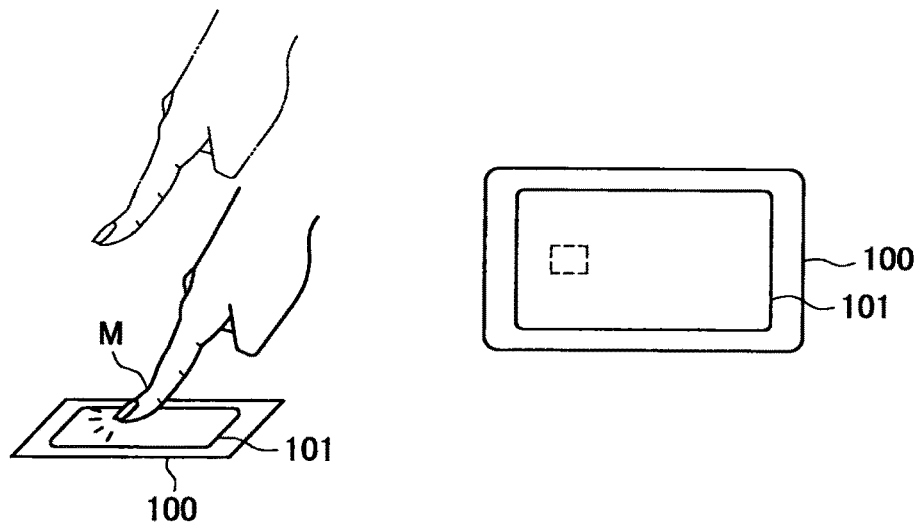
FIG. 14A is a schematic view showing the identification processing of the operation based on the contact gesture (pointing gesture)
Figure 14B:
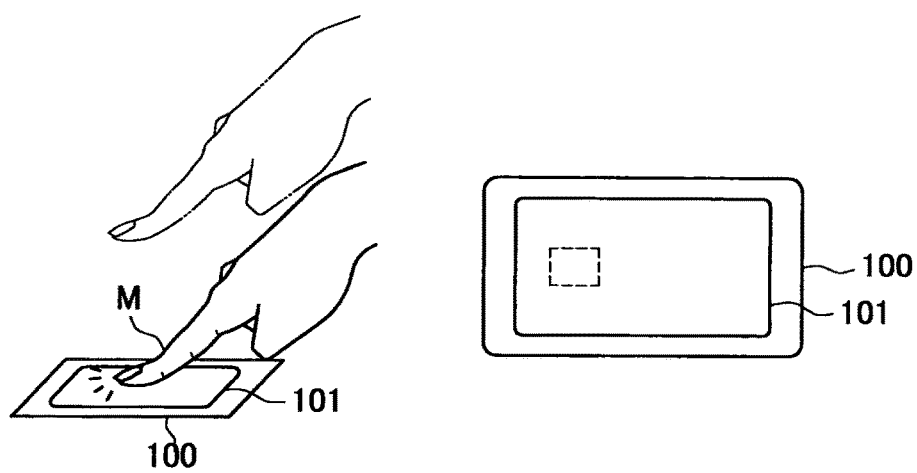
FIG. 14B is a schematic view showing the identification processing of the operation based on the contact gesture (pushing gesture)
Figure 14C:
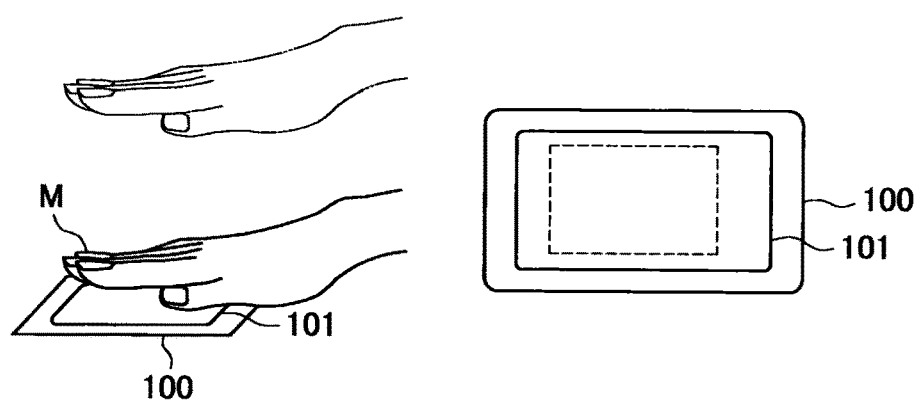
FIG. 14C is a schematic view showing the identification processing of the operation based on the contact gesture (covering gesture)

FIG. 13 and FIG. 14 are a flow diagram and schematic views showing identification processing of an operation based on a contact gesture. In FIG. 14, there is shown, as an example of the contact gesture, a point gesture by which an object is specified (FIG. 14A), a pushing gesture by which an object is specified (FIG. 14B), and a covering gesture by which no object is specified (FIG. 14C).

For example, the pointing gesture is a movement of bringing a fingertip into contact with an object, and the pushing gesture is a movement of bringing the ball of the finger into contact with an object. Moreover, the covering gesture is a movement of covering the display panel 101 with a plurality of fingers, for example. Here, each of the contact gestures is detected based on the contact area (and/or the contact form) of the operation tool M with respect to the display panel 101.

In the following, there will be described a case of identifying three operations corresponding to the pointing gesture, the pushing gesture, and the covering gesture, but there may be identified four or more gestures based on other contact gestures. In addition, there is assumed that each contact gesture is associated in advance with gesture information and a specific operation.

When the operation tool detection unit 109 detects contact of the operation tool M (S401), the operation tool detection unit 109 detects the contact position P and the contact area At of the operation tool M (S403).

The control unit 117 determines whether the contact position P of the operation tool M is within the region of a specific object (S405). The relationship between the contact position P and the object region is determined based on the position of the object stored in the storage unit 113. Moreover, in the case where the contact position P is within the regions of a plurality of objects, a gesture for not specifying an object is detected.

Then, in the case of positive determination result, the control unit 117 compares the contact area At with a predetermined threshold value Att1 (S407). Then, if the contact area At is less than the threshold value Att1, the control unit 117 identifies an operation corresponding to the pointing gesture (S409), and if the contact area At is equal to or greater than the threshold value Att1, the control unit 117 identifies an operation corresponding to the pushing gesture (S411).

On the other hand, in the case of negative determination result at the step S405, the control unit 117 compares the contact area At with a predetermined threshold value Att2 (Att1<Att2) (S413). Then, if the contact area At is equal to or greater than the threshold value Att2, the control unit 117 identifies an operation corresponding to the covering gesture (S415).

Here, the contact area At may be determined after the determination by comparison (S405) of the contact position P and the object region. Moreover, the operation tool detection unit 109 may detect the form of the contact region, the proximity state of the operation tool M or the like along with the contact area Aa. Then, the control unit 117 can accurately identify the operation based on the contact gesture by identifying the operation based on the contact area At only when the contact of the fingertip, the ball of the finger or the like is detected based on the form of the contact region or the proximity state of the operation tool M.

By this, various operations can be input based on the contact gesture of the operation tool M on the display panel 101. In particular, the user can perform an intuitive operation by giving an arbitrary meaning to each contact gesture, such as relating a local operation to a gesture with a fingertip, or relating a global operation to a gesture with a palm.

[4-5. Identification Processing of an Operation Based on Contact/Proximity State]

In the following, there will be described a processing of identifying an operation input by the operation tool M, based on the contact/proximity state of the operation tool M on the display panel 101.

Figure 15:
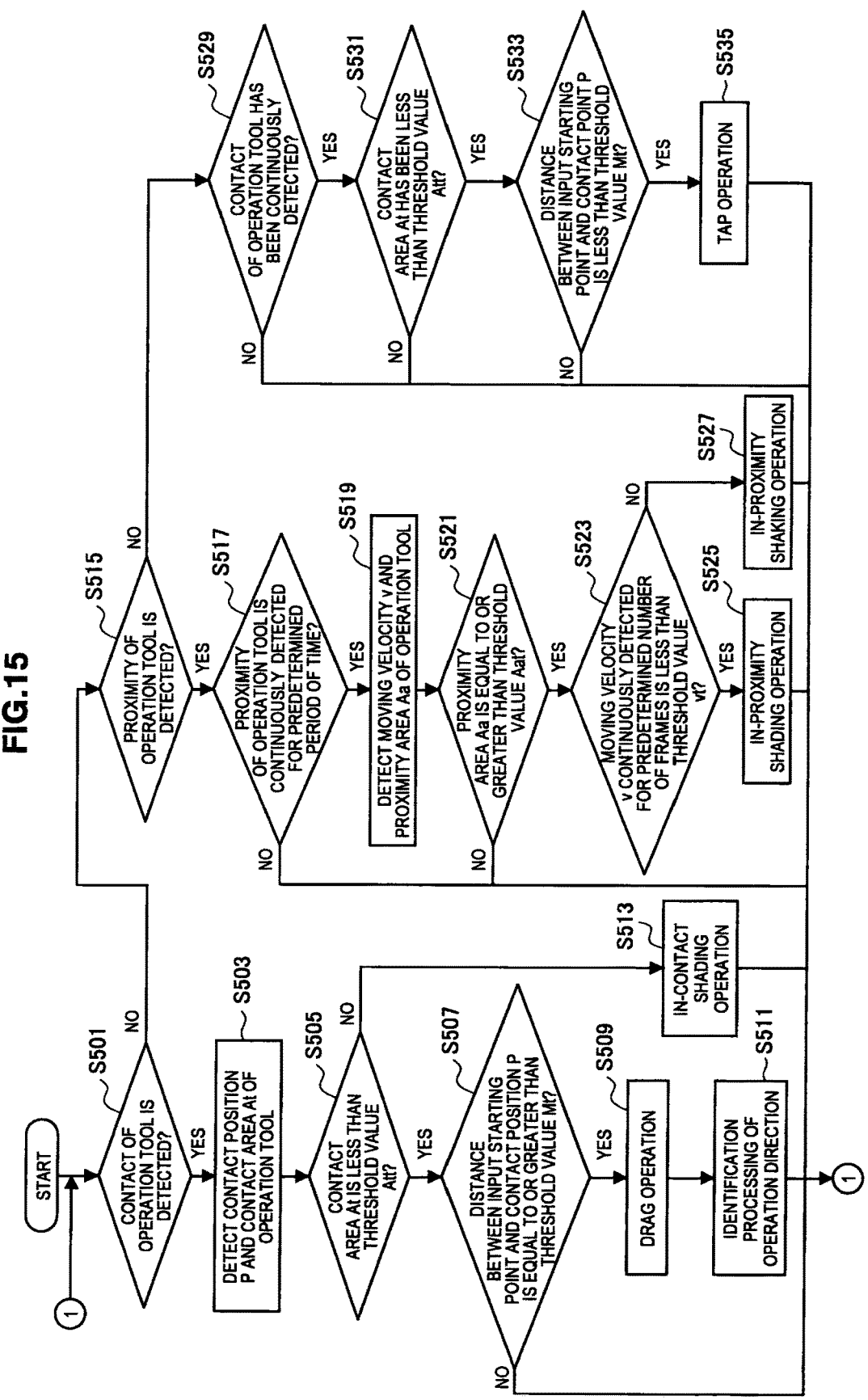
FIG. 15 is a flow diagram showing identification processing of an operation based on contact/proximity state.

FIG. 15 is a flow diagram showing identification processing of an operation based on contact/proximity state.

When the identification processing starts, the operation tool detection unit 109 detects the presence or absence of contact of the operation tool M with respect to the display panel 101, and when contact is detected (S501), the operation tool detection unit 109 detects the contact position P and the contact area At of the operation tool M (S503).

The control unit 117 determines whether the contact area At is less than a threshold value Att (S505). In the case of negative determination result, the control unit 117 identifies an in-contact shading operation (operation corresponding to the covering gesture) (S513). On the other hand, in the case of positive determination result, the control unit 117 determines whether the distance between the input starting point and the contact position P is equal to or greater than a threshold value Mt (S507), and in the case of positive determination result, the control unit 117 identifies a drag operation (S509). If the drag operation is identified here, the identification processing of the operation direction described above is performed (S511). On the other hand, in the case of negative determination result, the processing is restarted.

When the processing starts, the operation tool detection unit 109 detects the presence or absence of proximity of the operation tool M with respect to the display panel 101 (S515). When proximity is detected and if the proximity of the operation tool M is continuously detected for a predetermined time ("Yes" at the step S517), the operation tool detection unit 109 starts to detect the moving velocity v and the proximity area Aa of the operation tool M (S519) and if it is not continuously detected ("NO" at the step S517), the processing is restarted. Subsequently, the control unit 117 determines whether the proximity area Aa is equal to or greater than the threshold value Aat (S521), and in the case of negative determination result, the processing is restarted.

On the other hand, in the case of positive determination result at the step S521, the control unit 117 determines whether the absolute value of the moving velocity v continuously detected for the predetermined number of frames is less than the threshold value vt (S523). Then, in the case of positive determination result, the control unit 117 identifies an in-proximity shading operation (operation corresponding to the static gesture) (S525), and in the case of negative determination result, the control unit 117 identifies an in-proximity shaking operation (operation corresponding to the swinging gesture) (S527).

When the processing starts, the control unit 117 determines whether the contact of the operation tool M has been continuously detected (S529). The control unit 117 determines whether the contact area At has been less than the predetermined threshold value Att (S531). Then, in the case of positive determination result, the control unit 117 determines whether the distance between the input starting point and the contact position P is less than the threshold value Mt (S533), and if the determination result is positive, the control unit 117 identifies a tap operation (S535). On the other hand, in the case of determination results at the step S529, S531, and S533, the processing is restarted.

In the case of detecting the proximity state of the operation tool M, the display panel 101 and the operation tool M are separated from each other, so that there is a high possibility of false detection compared to the detection of the contact state. However, by a proximity gesture being captured only when the proximity area Aa equal to or greater than the predetermined threshold value Aat is detected, the false detection can be suppressed.

Moreover, in the case of detecting the contact/proximity state of the operation tool M at the same time, there is a high possibility of false detection by capturing the gesture, which is intended as contact gesture by the user, as proximity gesture. However, by a proximity gesture being captured only when the proximity state is detected for a predetermined duration time, the false detection can be suppressed.

[5. Control Method of a Detection Mode]

In the following, there will be described a method of controlling, according to the static/non-static state or the orientation of the information processing apparatus 100 (also referred to as the information processing apparatus 100 hereinafter), a mode for detecting an operation by the operation tool M on the information processing apparatus 100.

[5-1. Control Method of Proximity Detection Mode]

First, there will be described a variation of the present embodiment in which a mode for detecting a proximity operation by the operation tool M on the display panel 101 is controlled according to the static/non-static state of the information processing apparatus 100.

The contact/proximity sensor 103 includes a detection unit of a contact operation and a detection unit of a proximity operation. The contact/proximity sensor 103 continuously functions as a contact sensor when the information processing apparatus 100 is running and also functions as a proximity sensor when an application which supports a proximity gesture is running. In the following, there will be assumed a case where power supply systems are separately provided for the detection unit of a contact operation and the detection unit of a proximity operation. The state detection unit 111 includes an acceleration sensor and detects the static/non-static state of the operation tool itself.

The control unit 117 functions as a mode control unit for controlling the mode for detecting an operation by the operation tool M on the information processing apparatus 100, according to the static/non-static state of the information processing apparatus 100. In particular, the control unit 117 controls the proximity detection mode for detecting a proximity operation by the operation tool M on the display panel 101.

Figure 16:
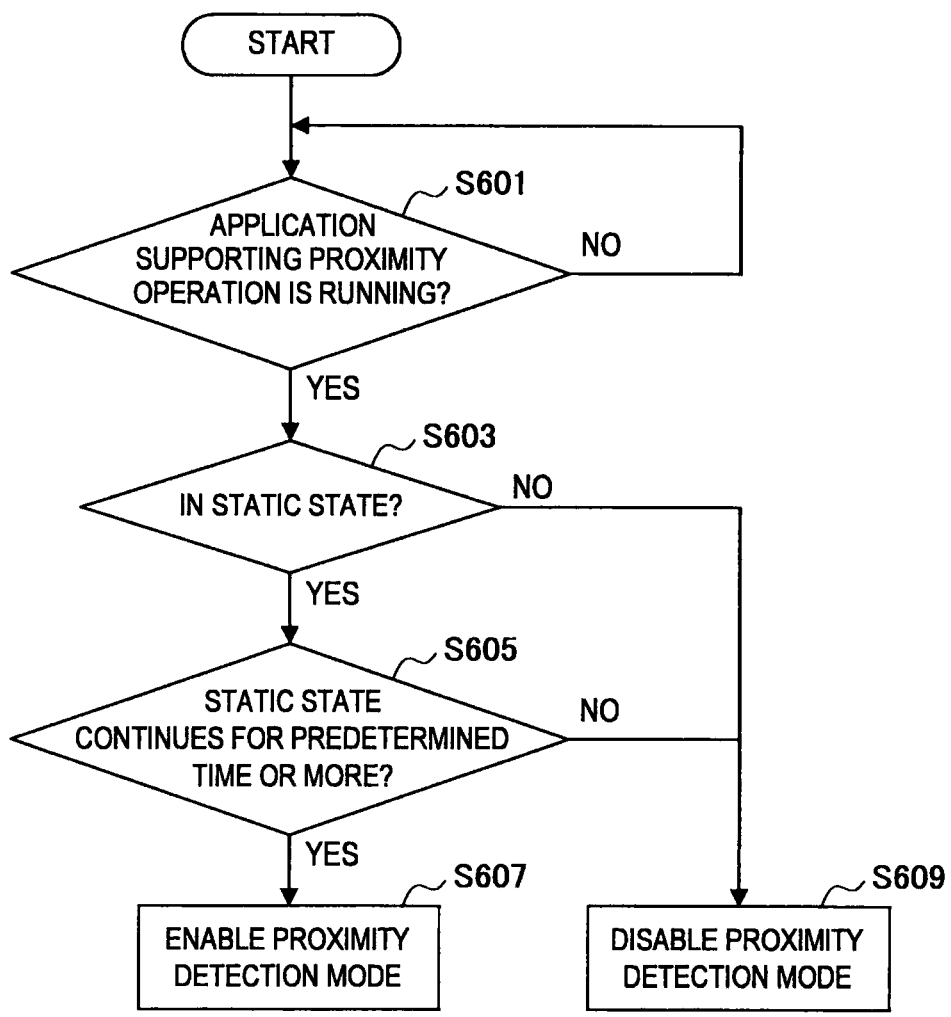
FIG. 16 is a flow diagram showing control processing of a proximity detection mode.

FIG. 16 and FIG. 17 are a flow diagram and schematic views showing control processing of the proximity detection mode.

The control unit 117 determines whether an application which supports a proximity operation is running (S601), and in the case of positive determination result, the control unit 117 determines whether the information processing apparatus 100 is in a static state according to a detection result by the state detection unit 111 (S603). On the other hand, in the case of negative determination result, the control unit 117 continues to determine whether the application is activated.

In the case where the information processing apparatus 100 is in a static state, the control unit 117 determines whether the static state continues for a predetermined time (S605), and in the case of positive determination result, the control unit 117 enables the proximity detection mode (S607). On the other hand, in the case of negative determination results at the steps S603 and S605, the control unit 117 disables the proximity detection mode (S609). In this case, detection processing and power supply corresponding to the proximity operation are omitted.

Figure 17A:
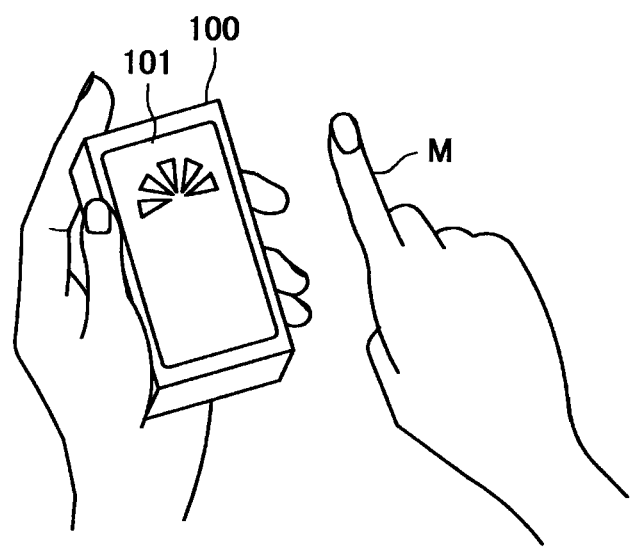
FIG. 17A is a schematic view showing the control processing of the proximity detection mode.

FIG. 17A shows a case where the information processing apparatus 100 is held by the user and is in a static state, when the application which supports a proximity operation is running. In this case, the proximity detection mode is active, and the user can perform a proximity operation by changing the proximity state of the operation tool M with respect to the display panel 101 (contact operation can be also performed in this state).

Figure 17B:
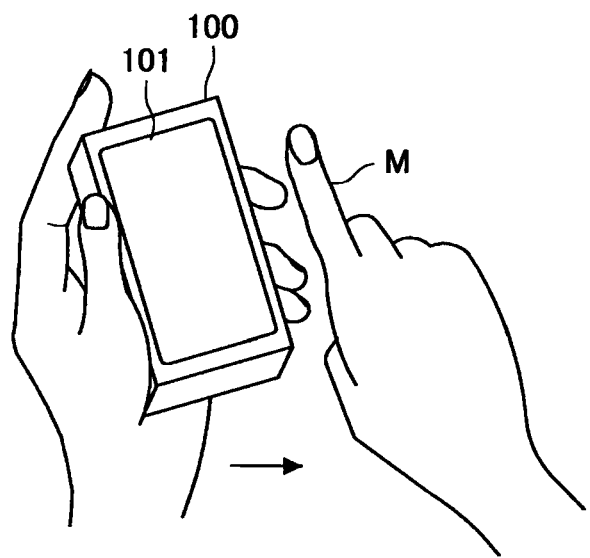
FIG. 17B is a schematic view showing the control processing of the proximity detection mode.

FIG. 17B shows a case where the information processing apparatus 100 is accidentally moved. In this case, if the operation tool M comes close to the display panel 101, a proximity operation unintended by the user is detected unless the proximity detection mode becomes inactive. However, since when the information processing apparatus 100 is in a moving state, the proximity detection mode automatically becomes inactive and no proximity operation is detected, the proximity operation unintended by the user is free from being detected. Then, when the information processing apparatus 100 becomes static state again, the proximity detection mode becomes active, so that the user can restart a proximity operation.

This enables the proximity detection mode to be controlled according to the static/non-static state of the information processing apparatus 100, so that in the case where the proximity operation does not have to be detected, the detection processing and the power supply corresponding to the proximity operation can be omitted. Moreover, the proximity operation unintended by the user is free from being detected. Furthermore, the user can seamlessly perform the contact operation and the proximity operation without having to control the detection mode by hand.

[5-2. Control Method of Proximity and Remote Detection Modes]

Subsequently, there will be described a variation of the present embodiment in which modes for detecting proximity and remote operations by the operation tool M on the display panel 101 are controlled according to the static/non-static state of the information processing apparatus 100.

The contact/proximity sensor 103 and the state detection unit 111 are the same as those in the variation described above. The remote sensor 107 images and captures a remote movement of the operation tool M such as a predetermined gesture. The remote sensor 107 includes a stereo camera or the like and functions when an application which supports a remote gesture is running. In the following, there will be assumed a case where power supply systems are separately provided for the contact/proximity sensor 103 and the remote sensor 107.

The control unit 117 particularly controls the proximity detection mode for detecting a proximity operation by the operation tool M on the display panel 101 and a remote detection mode for detecting a remote operation by the operation tool M on the remote sensor 107.

Figure 18:
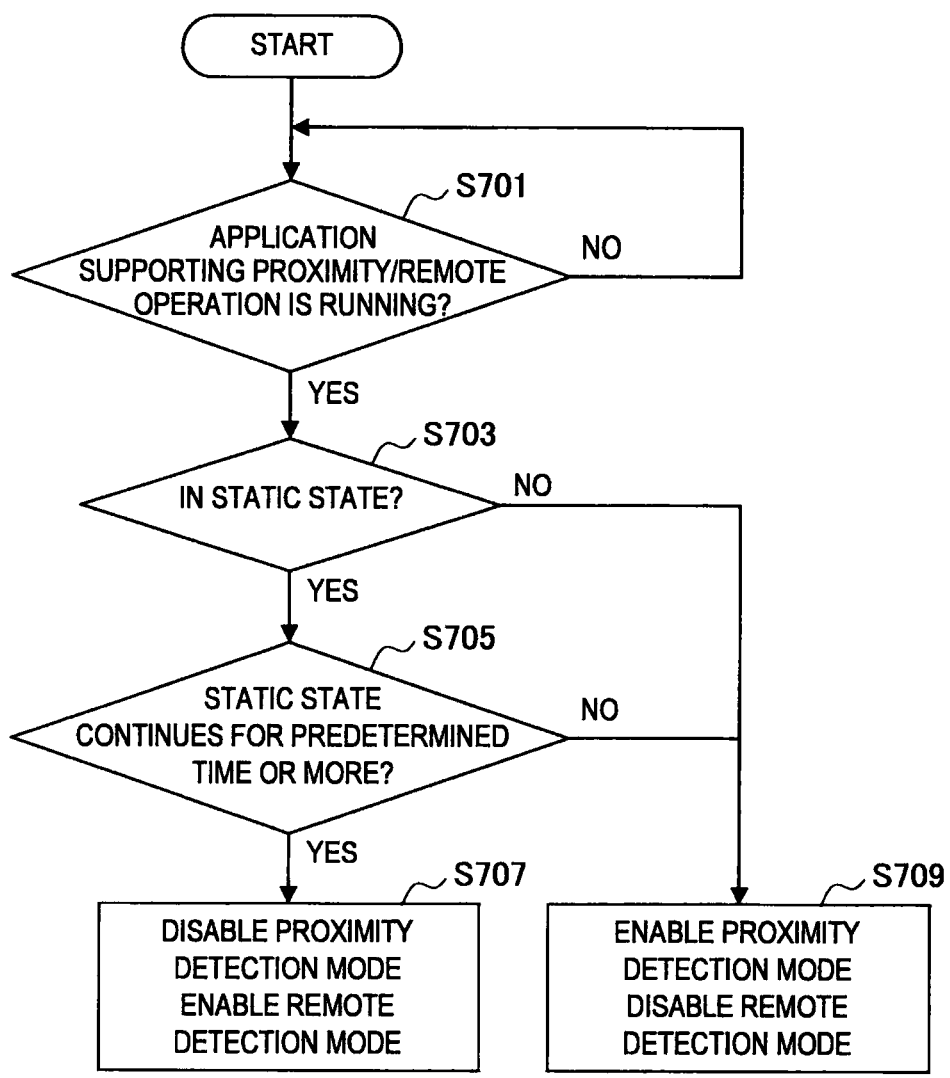
FIG. 18 is a flow diagram showing control processing of proximity and remote detection modes.

FIG. 18 and FIG. 19 are a flow diagram and schematic views showing control processing of the proximity and remote detection modes.

The control unit 117 determines whether an application which supports proximity and remote operations is running (S701), and in the case of positive determination result, the control unit 117 determines whether the information processing apparatus 100 is in a static state, according to a detection result by the state detection unit 111 (S703). On the other hand, in the case of negative detection result, the control unit 117 continues to determine whether the application is activated.

In the case where the information processing apparatus 100 is in a static state, the control unit 117 determines whether the static state continues for a predetermined time (S705), and in the case of positive determination result, the control unit 117 disables the proximity detection mode and enables the remote detection mode (S707). In this case, the detection processing and the power supply corresponding to the proximity operation are not performed. On the other hand, in the case of negative determination results at the steps S703 and S705, the control unit 117 enables the proximity detection mode and disables the remote detection mode (S709). In this case, detection processing and power supply corresponding to the remote operation are omitted.

Figure 19A:
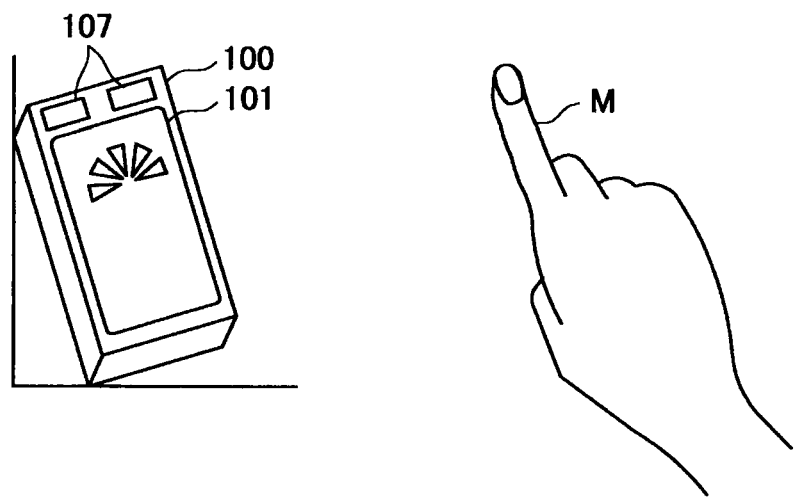
FIG. 19A is a schematic view showing the control processing of the proximity and remote detection modes.

FIG. 19A shows a case where the information processing apparatus 100 is disposed on a desk and in a static state, when the application which supports proximity and remote operations is running. In this case, the remote detection mode is active and the proximity detection mode is inactive, so that the user can perform a remote operation by changing a remote movement of the operation tool M with respect to the information processing apparatus 100 (contact operation can be also performed in this state).

Figure 19B:
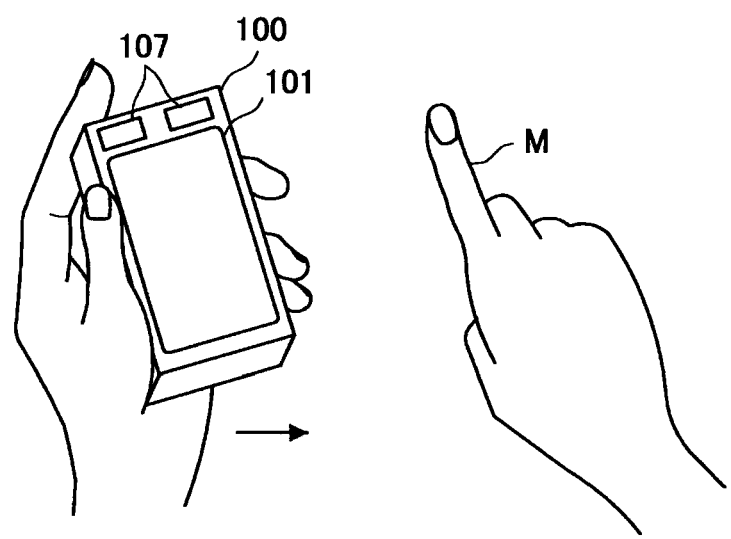
FIG. 19B is a schematic view showing the control processing of the proximity and remote detection modes.

FIG. 19B shows a case where the information processing apparatus 100 is held by the user and is in a moving (vibrating) state in a car or the like. In this case, since the information processing apparatus 100 is in a moving state, a remote operation unintended by the user may be detected unless the remote detection mode becomes inactive. However, since when the information processing apparatus 100 is in a moving state, the remote detection mode automatically becomes inactive and no remote operation is detected, the remote operation unintended by the user is free from being detected. Then, when the information processing apparatus 100 becomes static state again, the remote detection mode becomes active, so that the user can restart a remote operation.

This enables the proximity detection mode and remote detection modes to be controlled according to the static/non-static state of the information processing apparatus 100, so that in the case where the proximity operation or the remote detection mode does not have to be detected, the detection processing and the power supply corresponding to the proximity operation or the remote detection mode can be omitted. Moreover, the remote operation unintended by the user is free from being detected. Furthermore, the user can seamlessly perform the proximity operation and the remote operation without having to control the detection modes by hand.

[5-3. Control Method of Contact Detection Mode]

Furthermore, there will be described a method of controlling a mode for detecting a contact operation by the operation tool M on the information processing apparatus 100 according to an orientation of the information processing apparatus 100.

In the present variation, a primary sensor 103 is provided on the display panel 101 of the information processing apparatus 100, and secondary sensors 104R and 104L are provided on each side along the long axis and secondary sensors 104U and 104D are provided on each side along the short axis of the information processing apparatus 100. The primary sensor 103 detects a contact operation of the operation tool M on the display panel 101, and the secondary sensors 104R, 104L, 104U and 104D detect a contact operation of the operation tool M, for example, in order to scroll the GUI display of the display panel 101. In the following, there will be described a case where power supply systems are separately provided for the secondary sensors 104R, 104L, 104U and 104D.

The state detection unit 111 includes the gyroscope and detects the orientation of the information processing apparatus 100. In the following, cases where the directions of the long axis and the short axis of the information processing apparatus 100 are vertical to the user will be respectively called vertical orientation and horizontal direction. The state detection unit 111 detects whether the information processing apparatus 100 is vertically oriented and horizontally oriented.

The control unit 117 particularly controls the detection mode for detecting a contact operation on the secondary sensors 104R, 104L, 104U and 104D. For example, in the case where the information processing apparatus 100 is vertically oriented, the control unit 117 enables detection by the secondary sensors 104R and 104L and disables detection by the secondary sensors 104U and 104D, and in the case where the information processing apparatus 100 is horizontally oriented, the control unit 117 disables detection by the secondary sensors 104R and 104L and enables detection by the secondary sensors 104U and 104D. In particular, the control unit 117 enables the secondary sensors 104R, 104L, 104U and 104D corresponding to the dominant hand of the user according to the orientation of the information processing apparatus 100. In the following, there will be assumed a case where the user is right-handed.

Figure 20:
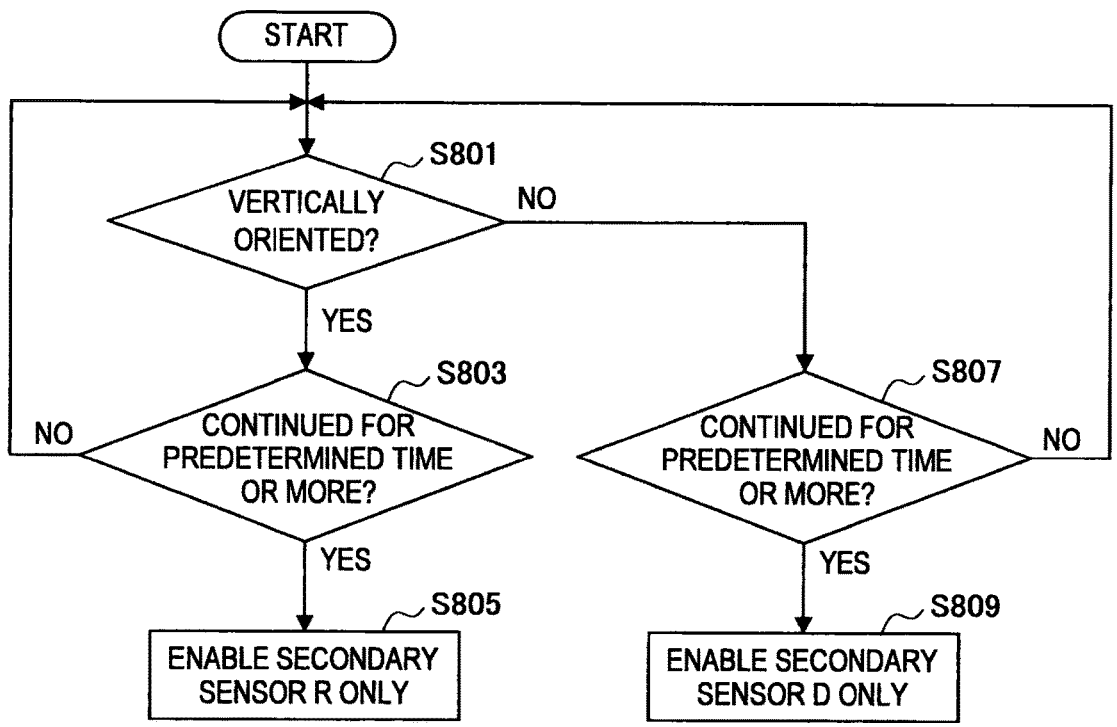
FIG. 20 is a flow diagram showing control processing of a contact detection mode.
Figure 21A:
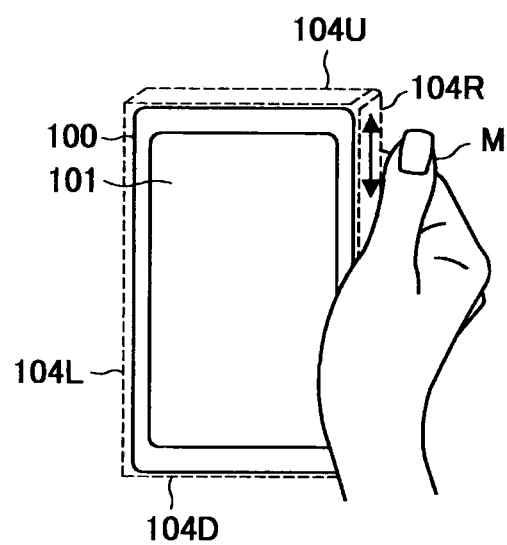
FIG. 21A is a schematic view showing the control processing of the contact detection mode.
Figure 21B:
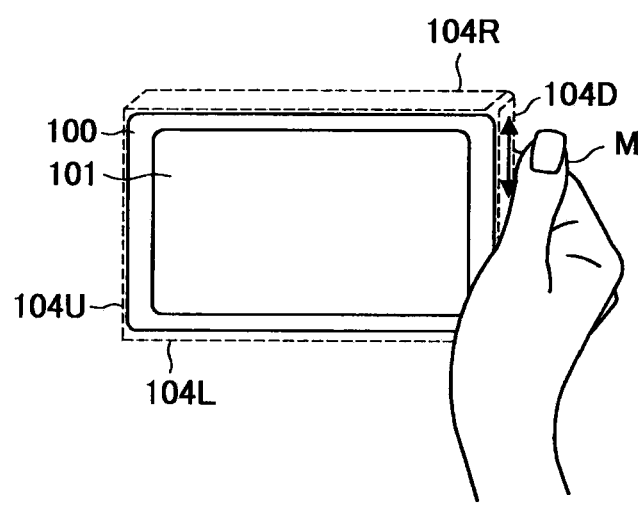
FIG. 21B is a schematic view showing the control processing of the contact detection mode.

FIG. 20 and FIG. 21 are a flow diagram and schematic views showing control processing of a contact detection mode.

The control unit 117 determines whether the information processing apparatus 100 is vertically oriented, according to the sensor output from the state detection unit 111 (S801), and in the case of positive determination result (FIG. 21A), the control unit 117 determines whether the information processing apparatus 100 is kept vertically oriented for a predetermined time (S803). Then, in the case of positive determination result, the control unit 117 enables the secondary sensor 104R on the right side with respect to the user and disables the other secondary sensors 104L, 104U and 104D (S805).

On the other hand, in the case where the information processing apparatus 100 is horizontally oriented (e.g., the top of the display panel 101 is oriented on the left side with respect to the user), the control unit 117 determines whether the information processing apparatus 100 is kept horizontally oriented for a predetermined time (S807). In the case of positive determination result (FIG. 21B), the control unit 117 enables the secondary sensor 104D on the right side with respect to the user and disables the other secondary sensors 104R, 104L and 104U (S809).

Figure 22:
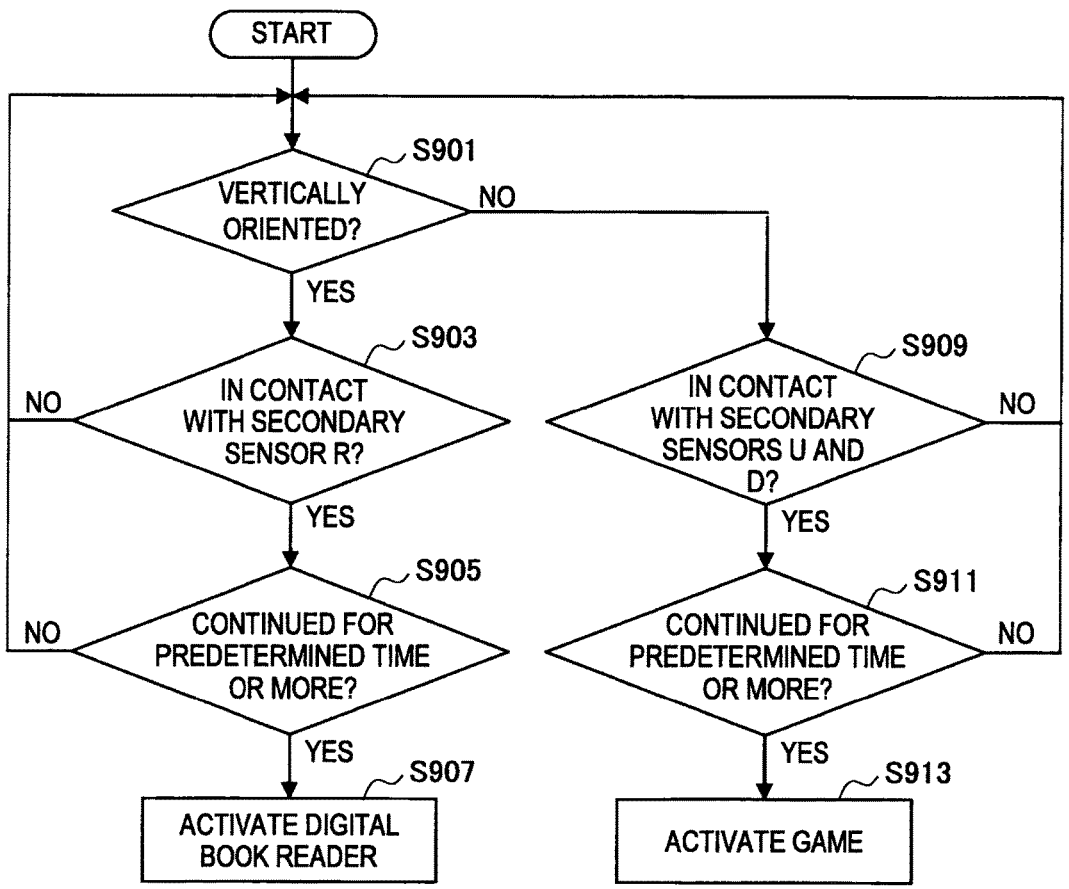
FIG. 22 is a flow diagram showing control processing of application activation.
Figure 23A:
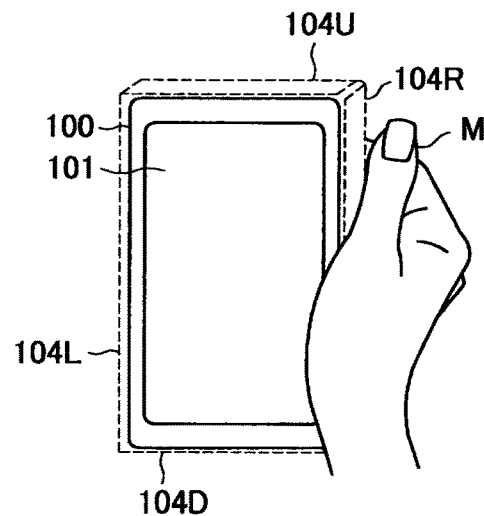
FIG. 23A is a schematic view showing the control processing of the application activation.
Figure 23B:
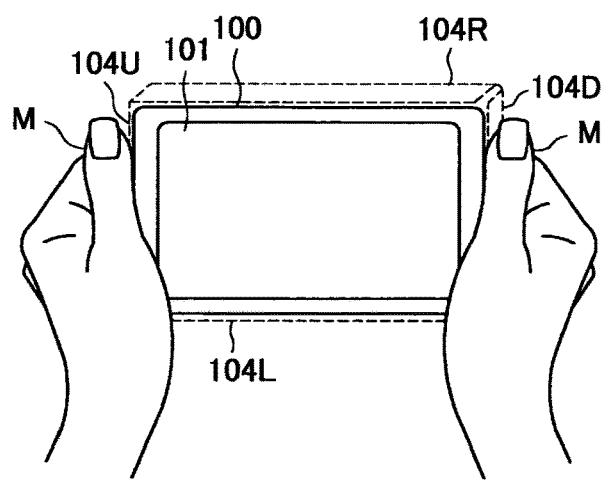
FIG. 23B is a schematic view showing the control processing of the application activation.
Figure 23C:
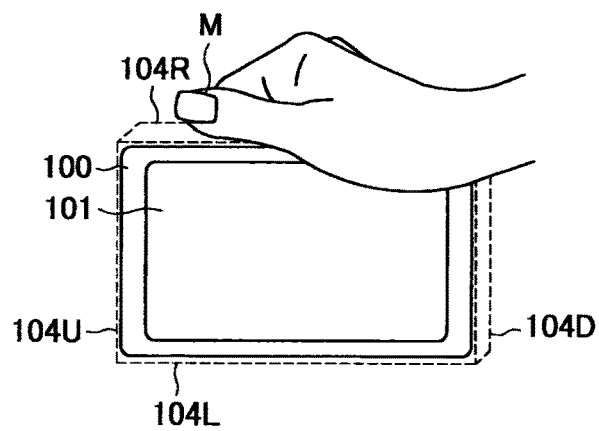
FIG. 23C is a schematic view showing the control processing of the application activation.

Moreover, FIG. 22 and FIG. 23 are a flow diagram and schematic views showing control processing of application activation.

The control unit 117 determines whether the information processing apparatus 100 is vertically oriented, according to the detection result of the state detection unit 111 (S901), and in the case of positive determination result (FIG. 23A), the control unit 117 determines whether the operation tool M is in contact with the secondary sensor 104R (S903). Next, in the case of positive determination result, the control unit 117 determines whether the operation tool M is kept in contact with the secondary sensor 104R for a predetermined time (S905). Then, in the case of positive determination result, the control unit 117 activates a digital book reader (S907).

On the other hand, in the case where the information processing apparatus 100 is horizontally oriented (e.g., the top of the display panel 101 is oriented on the left side with respect to the user), the control unit 117 determines whether the operation tool M is in contact with the secondary sensors 104U and 104D (S909). Next, in the case of positive determination result, the control unit 117 determines whether the operation tool M is kept in contact with the secondary sensors 104U and 104D for a predetermined time (S911). Then, in the case of positive determination result (FIG. 23B), the control unit activates a game (S913).

Moreover, the control unit 117 does not have to activate the digital book reader in the case where the information processing apparatus 100 is horizontally oriented and the operation tool M is in contact with one of the secondary sensors 104R, 104L, 104U and 104D by the user trying to hold the information processing apparatus 100 up, for example.

This enables the contact detection mode to be controlled according to the orientation of the information processing apparatus 100, so that in the secondary sensors 104 not subjected to a contact operation, detection processing and power supply corresponding to the contact operation can be omitted.

[6. Hardware Configuration of the Information Processing Apparatus 100]

FIG. 24 is a block diagram showing an example of the hardware configuration of the information processing apparatus 100.

The information processing apparatus 100 mainly includes a CPU 901, a ROM 903, a RAM 905, a host bus 907, a bridge 909, an external bus 911, an interface 913, an input device 915, an output device 917, a storage device 919, a drive 921, a connection port 923, and a communication device 925.

The CPU 901 functions as an arithmetic processing device and a control device and controls the operation of the information processing apparatus 100 at least partially according to various programs stored in the ROM 903, the RAM 905, the storage device 917, or a removable recording medium 927. The ROM 903 stores therein programs, parameters and the like used by the CPU 901. The RAM 905 temporarily stores therein the programs executed by the CPU 101 and parameters at the time of the execution of the programs and the like. The CPU 101, the ROM 903, and the RAM 905 are interconnected via the host bus 907. The host bus 907 is connected to the external bus 911 via the bridge 909.

The input device 915 is an input means operable by a user, such as a mouse, a keyboard, a display panel 101, a button, or a switch. Moreover, the input device 915 may be, for example, a remote operation means using electric wave such as infrared ray or an external device 929 such as a portable phone, a PDA or the like corresponding to the operation of the information processing apparatus 100. The input device 915 includes, for example, an input control circuit for generating an input signal based on operation information input by the user by using the operation means mentioned above and outputting the signal to the CPU 901. The user of the information processing apparatus 100 inputs various data into and gives instruction for processing operation to the information processing apparatus 100.

The output device 917 includes a device capable of notifying the user of obtained information visually and acoustically, such as a display device including a CRT display, a liquid crystal display, the display panel 101, or a lamp, an audio output device including a speaker or a headphone, a printer, a portable phone or a facsimile. The output device 917 outputs a processing result of the information processing apparatus 100. For example, the display device displays the processing result of the information processing apparatus 100 as text information or image information, and the audio output device converts audio signals of replayed audio data, acoustic data and the like into analogue signals and outputs them.

The storage device 919 is a device for data storage, which includes, for example, a magnetic storage device such as a HDD, a semiconductor storage device, an optical storage device, or a magnetooptical storage device. The storage device 919 stores therein the programs executed by the CPU 901, various data, various data obtained from the outside and the like.

The drive 921 is a reader/writer for recording medium and is built into or attached outside the information processing apparatus 100. The drive 921 reads out recorded data from the attached removable recording medium 927 such as a magnetic disk, an optical disk, a magneto-optical disk, or a semiconductor memory, and outputs the data to the RAM 905 and writes the data to be recorded.

The connection port 923 is a port for directly connecting the external device 929 to the information processing apparatus 100, such as a USB port, a SCSI port, a RS232C port or the like. The information processing apparatus 100 obtains data from and provides data to the external device 929 connected to the connection port 923, via the connection port 923.

The communication device 925 is a communication interface including, for example, a communication device for connecting to a communication network N. The communication device 925 is a wired or wireless LAN, a WUSB communication card, an ADSL router, or a communication modem, for example. The communication device 925 performs transmission and reception of a signal or the like with the Internet or another communication device in accordance with a predetermined protocol, for example. The communication network N connected to the communication device 925 is configured by a network connected wired or wirelessly or the like. For example, the communication network N may be the Internet, a home LAN, infrared data communication, radio wave communication, satellite communication or the like.

As above, one example of the hardware configuration for realizing the function of the information processing apparatus 100 according to the embodiment of the present invention has been described. In addition, each of the components of the hardware described above may be configured by using a device used for general purpose or may be configured by using a device specialized for the function of the each component.

[7. Summary]

As described above, the information processing apparatus 100 according to the embodiment of the present invention detects the static/non-static state or the orientation of the information processing apparatus 100 and controls the mode for detecting an operation by the operation tool M on the information processing apparatus 100. By this, the mode for detecting an operation by the operation tool M on the information processing apparatus 100 is controlled according to the static/non-static state or the orientation of the information processing apparatus 100, so that the detection mode can be appropriately controlled according to the operating state of the user.

Although the preferred embodiments of the present invention have been described in the foregoing with reference to the drawings, the present invention is not limited thereto. It should be understood by those skilled in the art that various modifications, combinations, sub-combinations and alterations may occur depending on design requirements and other factors insofar as they are within the scope of the appended claims or the equivalents thereof.

The present application contains subject matter related to that disclosed in Japanese Priority Patent Application JP 2009-126950 filed in the Japan Patent Office on May 26, 2009, the entire content of which is hereby incorporated by reference.

What is claimed is:

1. An information processing apparatus comprising:
   an operation tool detection unit configured to detect one or more of a remote operation by an operation tool to the information processing apparatus or a non-remote operation by the operation tool to the information processing apparatus;
   a state detection unit configured to detect a static state of the information processing apparatus or a non-static state of the information processing apparatus during a vibrating movement,
      wherein the static/non-static state of the information processing apparatus is determined based on feedback from an acceleration sensor of the state detection unit,
      wherein when the static state of the information processing apparatus is detected for a predetermined time or more, the information processing apparatus is further configured to enable the remote operation, and
      wherein when the non-static state of the information processing apparatus is detected or the static state of the information processing apparatus is detected for less than the predetermined time, the information processing apparatus is further configured to disable the remote operation; and
   a mode control unit configured to control a mode for detecting the remote operation by the operation tool to the information processing apparatus according to the detected static/non-static state of the information processing apparatus,
      wherein the operation tool detection unit comprises a remote sensor configured to detect the remote operation by the operation tool based on an imaging result, and
      wherein the operation tool detection unit, the state detection unit, and the mode control unit are each implemented via at least one processor.

2. The information processing apparatus according to claim 1,
 wherein the non-remote operation is an operation by the operation tool closer to the display panel than the remote operation.

3. The information processing apparatus according to claim 1,
 wherein the operation tool detection unit is configured to detect the remote operation by the operation tool to the information processing apparatus using the remote sensor while detecting the non-remote operation using a second sensor different from the remote sensor, and
 wherein the non-remote operation is an operation by the operation tool closer to information processing apparatus than the remote operation.

4. The information processing apparatus according to claim 1,
 wherein the non-remote operation includes at least one of a contact operation by the operation tool on the information processing apparatus or a proximity operation by the operation tool to the information processing apparatus.

5. The information processing apparatus according to claim 1,
 wherein the information processing apparatus is further configured to enable detection of a proximity operation when detection of the remote operation is disabled and to disable detection of the proximity operation when detection of the remote operation is enabled.

6. The information processing apparatus according to claim 1,
 wherein the remote sensor comprises a stereo camera.

7. An information processing method, implemented via at least one processor, the method comprising:
 detecting one or more of a remote operation by an operation tool to an information processing apparatus or a non-remote operation by the operation tool to the information processing apparatus;
 detecting a static state of an information processing apparatus or a non-static state of the information processing apparatus during a vibrating movement,
 wherein the static/non-static state of the information processing apparatus is determined based on feedback from an acceleration sensor,
 wherein when the static state of the information processing apparatus is detected for a predetermined time or more, the information processing apparatus is further configured to enable the remote operation, and
 wherein when the non-static state of the information processing apparatus is detected or the static state of the information processing apparatus is detected for less than the predetermined time, the information processing apparatus is further configured to disable the remote operation; and
 controlling a mode for detecting the remote operation by the operation tool to the information processing apparatus according to the detected static/non-static state of the information processing apparatus,
 wherein the remote operation is detected based on an imaging result obtained from a remote sensor.

8. The information processing method according to claim 7,
 wherein the non-remote operation is an operation by the operation tool closer to the display panel than the remote operation.

9. A non-transitory computer-readable medium having embodied thereon a program, which when executed by a computer, causes the computer to perform an information processing method, the method comprising the steps of:
 detecting one or more of a remote operation by an operation tool to an information processing apparatus or a non-remote operation by the operation tool to the information processing apparatus;
 detecting a static state of an information processing apparatus or a non-static state of the information processing apparatus during a vibrating movement,
 wherein the static/non-static state of the information processing apparatus is determined based on feedback from an acceleration sensor,
 wherein when the static state of the information processing apparatus is detected for a predetermined time or more, the information processing apparatus is further configured to enable the remote operation, and
 wherein when the non-static state of the information processing apparatus is detected or the static state of the information processing apparatus is detected for less than the predetermined time, the information processing apparatus is further configured to disable the remote operation; and
 controlling a mode for detecting the remote operation by the operation tool to the information processing apparatus according to the detected static/non-static state of the information processing apparatus,
 wherein the remote operation is detected based on an imaging result obtained from a remote sensor.

10. The information processing method according to claim 7,
 wherein the non-remote operation includes at least one of a contact operation by the operation tool on the information processing apparatus or a proximity operation by the operation tool to the information processing apparatus.

11. The non-transitory computer-readable medium according to claim 9,
 wherein the non-remote operation is an operation by the operation tool closer to the display panel than the remote operation.

12. The information processing method according to claim 7, further comprising:
 detecting the remote operation by the operation tool on the information processing apparatus using the remote sensor while detecting the non-remote operation using a second sensor different from the remote sensor,
 wherein the non-remote operation is an operation by the operation tool closer to information processing apparatus than the remote operation.

13. The non-transitory computer-readable medium according to claim 9, wherein the method further comprises:
 detecting the remote operation by the operation tool to the information processing apparatus using the remote sensor while detecting the non-remote operation using a second sensor different from the remote sensor,
 wherein the non-remote operation is an operation by the operation tool closer to information processing apparatus than the remote operation.

14. The non-transitory computer-readable medium according to claim 9,
 wherein the non-remote operation includes at least one of a contact operation by the operation tool on the information processing apparatus or a proximity operation by the operation tool to the information processing apparatus.

15. An information processing apparatus comprising:
an acceleration sensor configured to detect a static state of the information processing apparatus or a non-static state of the information processing apparatus during a vibrating movement;
a remote sensor configured to detect one or more of a remote operation by an operation tool to the information processing apparatus or a non-remote operation by the operation tool to the information processing apparatus, based on an imaging result; and
at least one processor configured to
when the static state of the information processing apparatus is detected, enable the remote operation, and
when the non-static state of the information processing apparatus is detected, disable the remote operation, and
wherein the remote operation is detected based on an imaging result obtained from a remote sensor.

16. The information processing apparatus according to claim 15,
wherein the at least one processor is configured to
when the static state of the information processing apparatus is detected, enable the remote operation by activating the remote sensor, and
when the non-static state of the information processing apparatus is detected, disable the remote operation by deactivating the remote sensor.

17. The information processing apparatus according to claim 16,
wherein the at least one processor is further configured to disable the remote operation by preventing a power supply system from supplying power to the remote sensor when the non-static state of the information processing apparatus is detected.

* * * * *